United States Patent [19]
Otsuka

[11] Patent Number: 6,044,436
[45] Date of Patent: Mar. 28, 2000

[54] RECORDING/REPRODUCING APPARATUS INCLUDING FILE MANAGEMENT INFORMATION

[75] Inventor: Satoshi Otsuka, Kanagawa, Japan

[73] Assignee: Sony Corporation, Tokyo, Japan

[21] Appl. No.: 08/967,010

[22] Filed: Nov. 10, 1997

[30] Foreign Application Priority Data

Nov. 15, 1996 [JP] Japan .............................. P08-318573

[51] Int. Cl.[7] .................................................. G06F 12/00
[52] U.S. Cl. .................................. 711/112; 711/1; 711/4; 711/111; 711/114
[58] Field of Search .................................. 711/112, 147, 711/202, 206, 201, 148, 1, 4, 111, 114; 707/1

[56] References Cited

U.S. PATENT DOCUMENTS

| | | | |
|---|---|---|---|
| 5,247,640 | 9/1993 | Maehara | 711/112 |
| 5,434,994 | 7/1995 | Shaheen et al. | 707/201 |
| 5,461,603 | 10/1995 | Otsuka | 369/120 |
| 5,682,512 | 10/1997 | Tetrick | 711/202 |
| 5,710,907 | 1/1998 | Hagersten et al. | 711/148 |
| 5,778,429 | 7/1998 | Sukegawa et al. | 711/129 |
| 5,893,144 | 4/1999 | Wood et al. | 711/122 |

FOREIGN PATENT DOCUMENTS

| | | | |
|---|---|---|---|
| 58-169366 | 10/1983 | Japan | G11B 19/02 |
| 8-70486 | 3/1996 | Japan | H04Q 9/00 |

*Primary Examiner*—Do Hyun Yoo
*Assistant Examiner*—Than Nguyen
*Attorney, Agent, or Firm*—Limbach & Limbach L.L.P.

[57] ABSTRACT

A recording/reproducing apparatus which makes a disk driver and the whole data system efficient is provided. The recording/reproducing apparatus comprises, in the state in which at least recording media is charged, holding means for holding a file manager thereof, external interface means for performing certain data communication by means of a system such as infrared data communication, LAN communication and the like and control means for executing the recording/reproducing operation to/from the recording media by using the file manager held in the holding means in correspondence to a request made from the external equipment via the external interface means.

35 Claims, 19 Drawing Sheets

AE

ARW

AE
ARW

ARW
AE

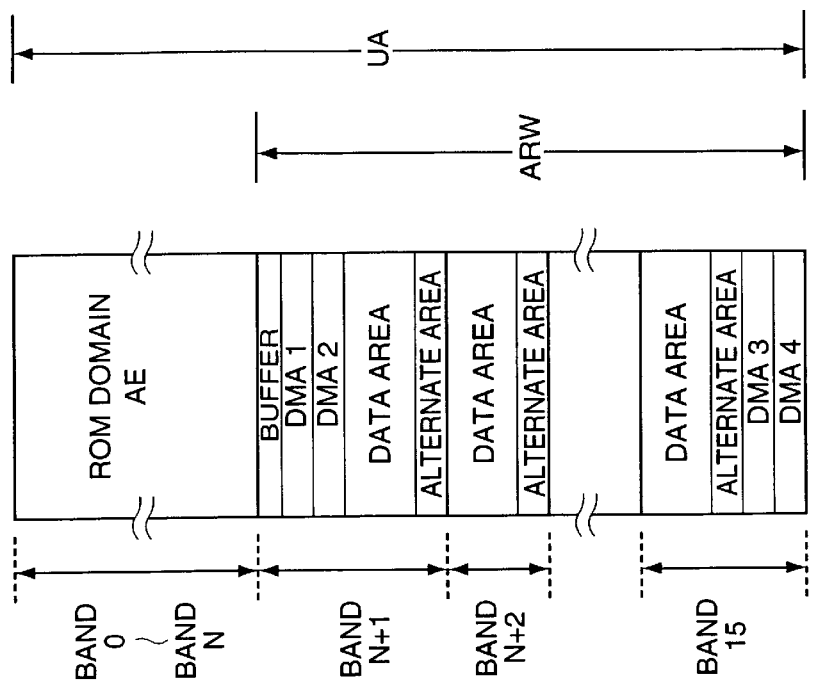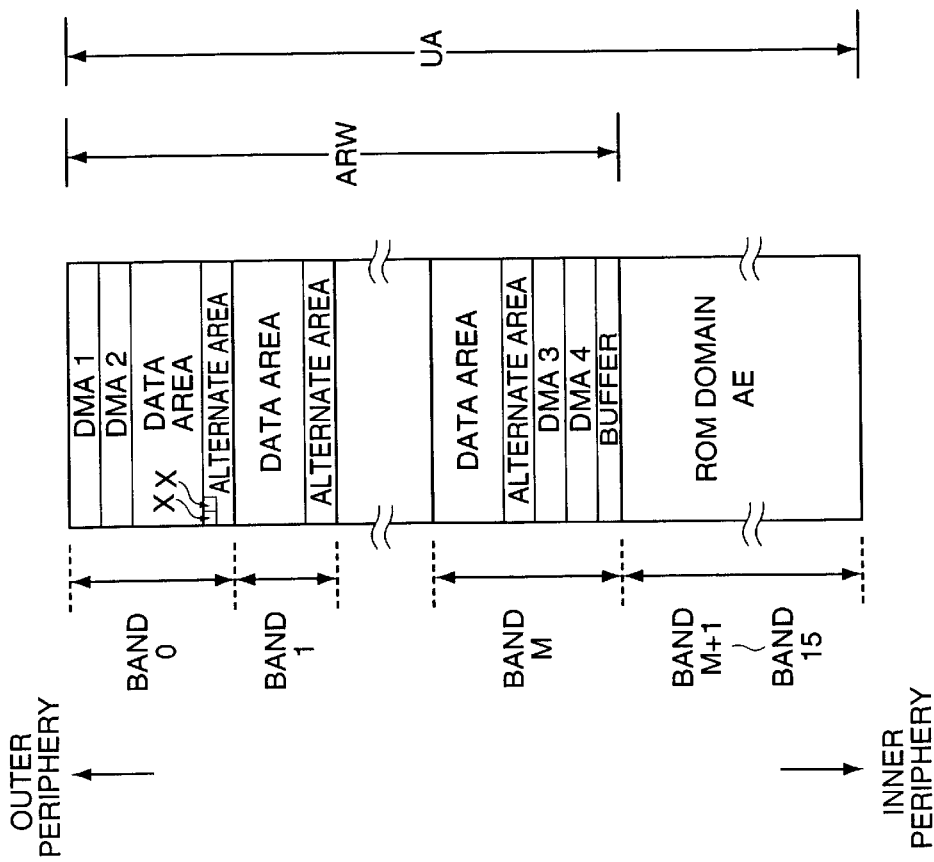

FIG.5

| BYTE | CONTENTS |
|---|---|
| 0~19 | SAME INFORMATION WITH GCP DATA (20 BYTES) |
| 20~29 | MEDIA INFORMATION |
| 30~99 | SYSTEM INFORMATION |
| 100~419 | BAND INFORMATION |
| 420~2047 | RESERVE |

FIG.6

| 00h | 00000000 | ROM MEDIA |
|---|---|---|
| 20h | 00100000 | RAM MEDIA |
| A0h | 10100000 | PARTIAL ROM MEDIA |

FIG.12A

| 24B | " HS FILE P-ROM SYSTEM " |
|---|---|
| 6B | FILE ID (FAT 12, FAT 16, HFS, etc) |
| 2B | NUMBER OF BYTES PER ONE SECTOR |
| 1B | NUMBER OF SECTORS PER ONE ALLOCATION |
| 8B | START SECTOR OF FILE MANAGER |
| 4B | NUMBER OF SECTORS OF FILE MANAGER |
| 1B | " FF " (END ID) |

FIG.12B

| 24B | " HS FILE P-RAM SYSTEM " |
|---|---|
| 6B | FILE ID (FAT 12, FAT 16, HFS, etc) |
| 2B | NUMBER OF BYTES PER ONE SECTOR |
| 1B | NUMBER OF SECTORS PER ONE ALLOCATION |
| 8B | START SECTOR OF FILE MANAGER |
| 4B | NUMBER OF SECTORS OF FILE MANAGER |
| 1B | " FF " (END ID) |

FIG.12C

| 24B | " HS FILE RAM SYSTEM " |
|---|---|
| 6B | FILE ID (FAT 12, FAT 16, HFS, etc) |
| 2B | NUMBER OF BYTES PER ONE SECTOR |
| 1B | NUMBER OF SECTORS PER ONE ALLOCATION |
| 8B | START SECTOR OF FILE MANAGER |
| 4B | NUMBER OF SECTORS OF FILE MANAGER |
| 1B | " FF " (END ID) |

FIG.12D

| 24B | " HS FILE ROM SYSTEM " |
|---|---|
| 6B | FILE ID (FAT 12, FAT 16, HFS, etc) |
| 2B | NUMBER OF BYTES PER ONE SECTOR |
| 1B | NUMBER OF SECTORS PER ONE ALLOCATION |
| 8B | START SECTOR OF FILE MANAGER |
| 4B | NUMBER OF SECTORS OF FILE MANAGER |
| 1B | " FF " (END ID) |

RECORDING/REPRODUCING APPARATUS INCLUDING FILE MANAGEMENT INFORMATION

BACKGROUND OF THE INVENTION

The present invention relates to a recording/reproducing apparatus suitable for a disk drive or the like for recording/reproducing data to/from recording media in a computer system, a multi-media system, a data communication system and the like.

It is a general practice to provide various softwares and data to be used in a computer system by using recording media such as an optical disk, an optical magnetic disk, a magnetic disk, a memory card, a magnetic tape and the like or for users to store data and the like in those recording media.

In this case, a disk drive for performing a recording/reproducing operation on the recording media such as the optical disk and the optical magnetic disk is normally connected to a host computer to write/read data to/from the disk in correspondence to a control made from the host computer.

By the way, in the system for recording/reproducing data to/from the recording media as described above, the host computer manages a data file and the like on the recording media in general. Therefore, the host computer holds management data and management software (hereinafter referred to as file manager) for managing the file, i.e. for managing the reading/writing operation of data, in the charged disk, and requests the disk drive to write/read at the appropriate address by using the file manager.

That is, when the disk drive is seen as a single apparatus, it holds no information as the file manager to the disk and therefore, it executes the necessary operation for the first time when the write/read request is made by the host computer. In other words, the disk drive could not be used as a recording/reproducing apparatus unless it is connected to the specific host computer.

Because disk drive itself does not manage file names and the like, it cannot respond to a request for reading a file in the mode of specifying the file name from another equipment for example even if such request is made. It is the same also when a write request is made while transmitting data and a file name.

That is, the disk drive cannot be built-in a network file system independently from the host computer or cannot be used in accessing data or in storing data from another information equipment such as a note-type personal computer and PDA (Personal Digital Assistants). Therefore, the function of the disk drive has been limited and it has been required to realize a more useful usage.

In view of such problems, the present invention is intended to allow the disk drive, i.e. the recording/reproducing apparatus, to deal with a recording/reproducing request made from equipments other than the specific host computer and thereby to make the recording/reproducing apparatus and the whole data system more efficient.

SUMMARY OF THE INVENTION

In order to achieve the above-mentioned object, a recording/reproducing apparatus of the present invention comprises, in the state in which at least recording media is charged, holding means for holding file management information about the recording media, external interface means for performing certain data communication by means of a system such as infrared data communication, LAN communication and the like and control means for executing the recording/reproducing operation to/from the recording media by using the file management information held in the holding means in correspondence to a request made from the external equipment via the external interface means.

That is, the file management information about the recording media is held within the recording/reproducing apparatus so that it can deal with a direct access specifying a file name or the like from the external equipment.

It is possible to arrange such that the file management information is recorded on the recording media and the file management information read from the recording media is held in the holding means or such that a storage section for storing respective file management information about one or a plurality of recording media to be charged is provided as the holding means.

The control means is arranged so as not to respond to a request for recording/reproducing data to/from the recording media made from the external equipment at least during the period in which the process for recording/reproducing data to/from the recording media is being executed due to a request made from the host equipment and so as not to respond to a request for recording/reproducing data to/from the recording media made from the host equipment at least during the period in which the process for recording/reproducing data to/from the recording media is being executed due to a request made from the external equipment.

The above and other related objects and features of the invention will be apparent in the following description and the accompanying drawings.

BRIEF DESCRIPTION OF DRAWINGS

FIGS. 3A and 3B are explanatory diagrams of the structure of user area of a partial ROM disk;

FIG. 5 is an explanatory diagram of data in a SFP zone of a disk according to the embodiment of the present invention;

FIG. 6 is an explanatory diagram of media type codes according to the embodiment of the present invention;

FIGS. 12A through 12D are explanatory diagrams of file system information in the disk of the embodiment of the present invention;

DESCRIPTION OF THE PREFERRED EMBODIMENT

Figure 1A:
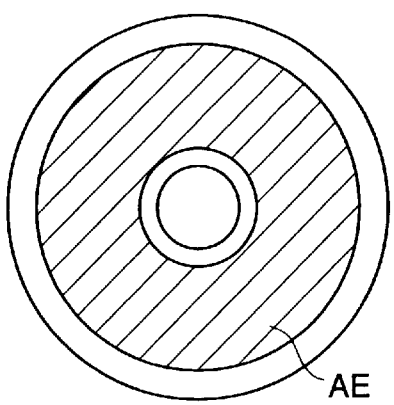
FIGS. 1A through 1D are explanatory diagrams of various disks.
Figure 1B:
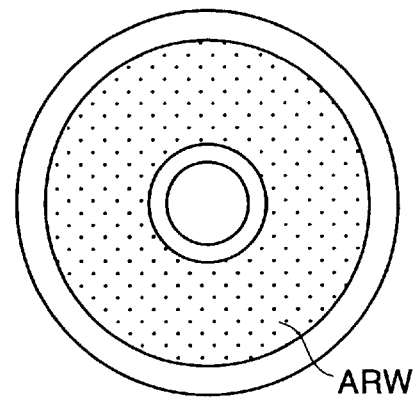

A disk drive (recording/reproducing apparatus) in a data storage system which is the embodiment of the recording/reproducing apparatus of the present invention will be explained below. It is noted that the explanation will be made in the following order and a ROM disk, a RAM disk and a partial ROM disk will be exemplified here as recording media to be used:

1. Area Structure of Various Disks;
2. User Area of Partial ROM Disk and RAM Disk;
3. Control Information;
4. Example of System Structure;
5. Structure of Disk Drive;
6. Operation in Charging Disk;
7. Operation in Making Recording/Reproducing Request 1. Area Structure of Various Disks FIGS. 1A through 1D show various disk media, wherein FIG. 1A shows a ROM disk in which the whole main data area is a read-only area (ROM area) AE created by embossed bits for example and FIG. 1B shows a RAM disk in which the whole main data area is a rewritable area ARW composed of an optical magnetic area for example in which data can be recorded/reproduced.

Figure 1C:
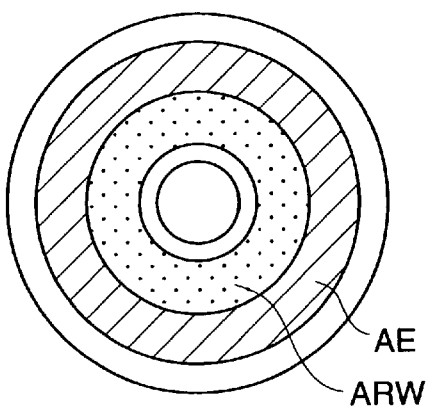
Figure 1D:
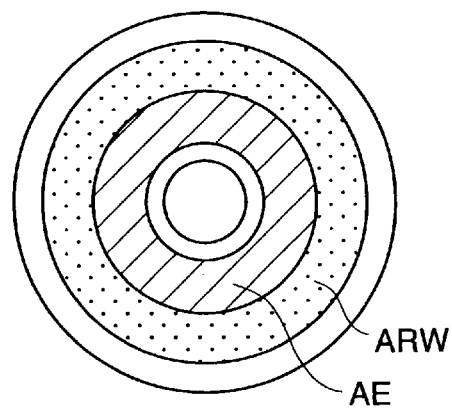

A partial ROM disk has a structure as shown in FIG. 1C or 1D for example. That is, the ROM area AE and the rewritable area ARW are provided in the main data area in one disk.

Figure 2:
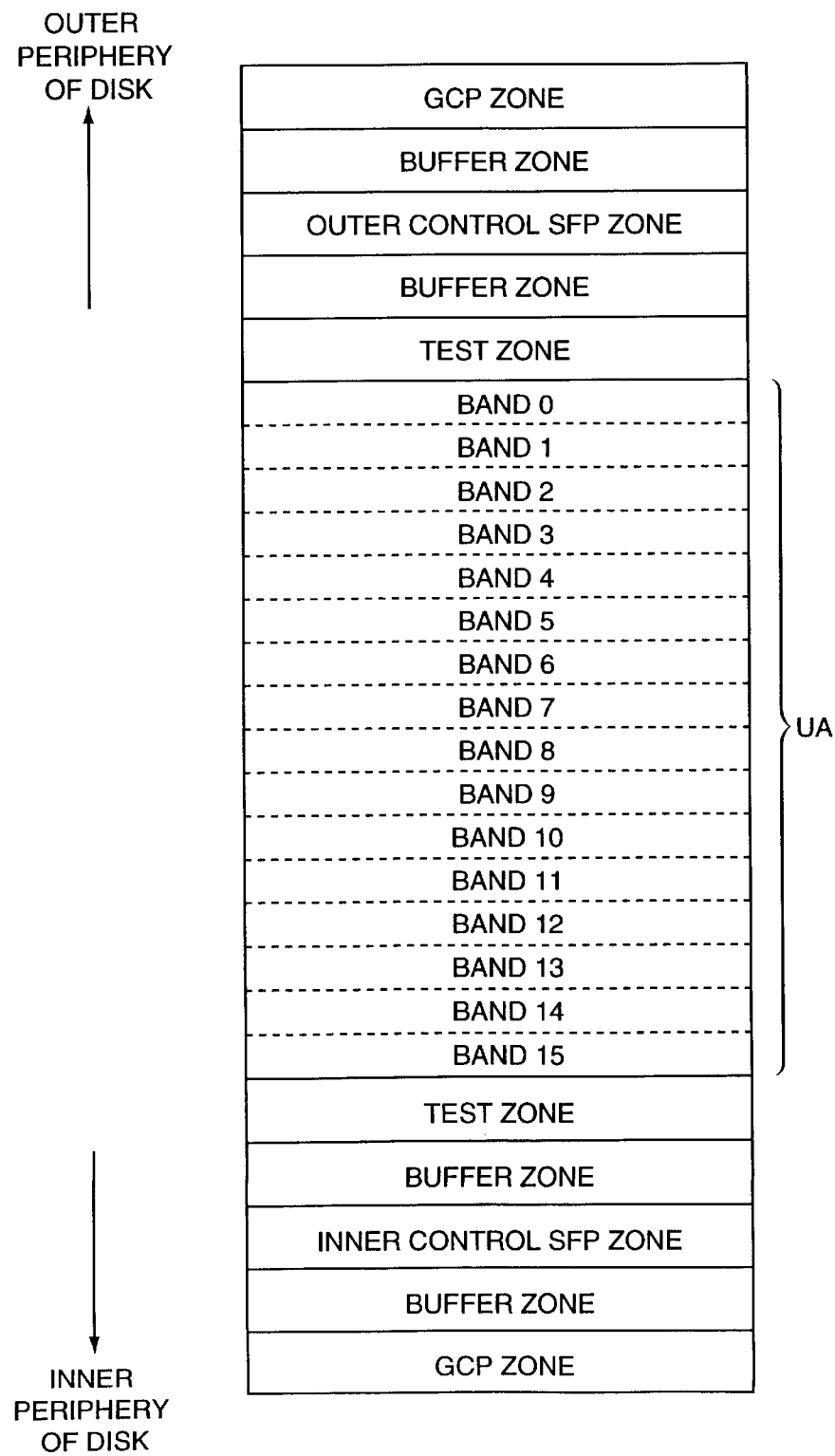
FIG. 2 is an explanatory diagram of the area structure of each disk.

FIG. 2 shows the structure of areas from the outer periphery to the inner periphery which is common to each disk shown in FIGS. 1A through 1D.

A GCP (Gray Code Part) zone of 736 tracks is provided at the outermost periphery of the disk and a buffer zone of two tracks, an outer control SFP zone of five tracks, a buffer zone of two tracks and a test zone of five tracks are provided toward the inner periphery.

In succession to the test zone, the user area as the main data area composed of the rewritable area ARW to which user can record desirable data and the read-only ROM area AE is formed. The user area is divided into 16 bands of the band 0 to the band 15.

In the ROM disk shown in FIG. 1A, all of the user area is the ROM area AE into which data has been recorded by means of embossed pits. In the RAM disk shown in FIG. 1B, all of the user area is the rewritable area ARW. In the partial ROM disks shown in FIGS. 1C and 1D, part of the band 0 through the band 15 is the ROM area AE and the other part is the rewritable area ARW. The producer of the disk can set arbitrarily how many bands of the 16 bands should be appropriated to the rewritable area ARW and how many bands should be appropriated to the ROM area AE.

Then, there are provided a test zone of five tracks, a buffer zone of two tracks, an inner control SFP zone of five tracks, a buffer zone of two tracks and a GCP zone of 820 tracks at the inner periphery side from the user area.

The GCP zone, the outer control SFP zone and the inner control SFP zone are the areas in which predetermined control information is recorded.

This disk is a so-called zone CAV disk in which the rate of number of revolution of the disk is constant and a recording/reproducing clock is varied per zone and the 16 bands of the band 0 through the band 15 in the user area are zones which correspond to the specific recording/reproducing clocks, respectively.

2. User Area of Partial ROM Disk and RAM Disk

Figure 4:
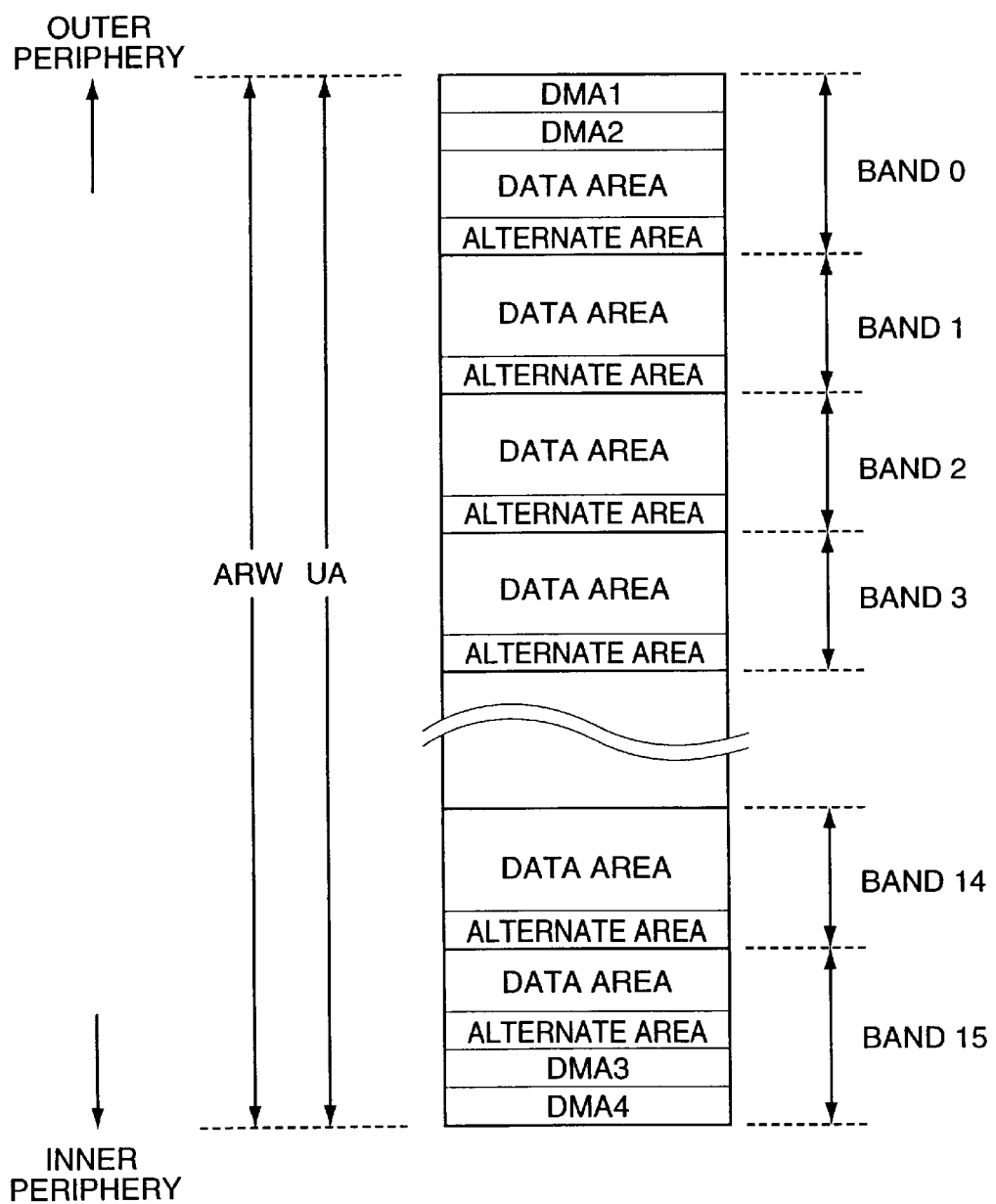
FIG. 4 is an explanatory diagram of the structure of a user area of a RAM disk.

FIGS. 3A and 3B and FIG. 4 show in detail the structure of the rewritable area ARW of the user area composed of the 16 bands. FIG. 3A shows the partial ROM disk in which the rewritable area ARW is provided in the user area on the outer periphery side of the disk, FIG. 3B shows the partial ROM disk in which the rewritable area ARW is provided on the inner periphery side of the disk and FIG. 4 shows the RAM disk.

In case of FIG. 3A, the band 0 to the band M are the rewritable area ARW in the user area and the band (M+1) to the band 15 are the ROM area AE. In case of FIG. 3B, the band 0 to the band N are the ROM area AE in the user area and the band (N+1) to the band 15 are the rewritable area ARW. As for the ROM disk shown in FIG. 4, all of the bands from the band 1 to the band 15 are the rewritable area ARW.

As it can be seen in FIGS. 3A and 3B and FIG. 4, defect management areas DMA1 and DMA2 are provided at the top area of the bands where the rewritable area ARW begins and defect management areas DMA3 and DMA4 are provided at the last area of the band where the rewritable area ARW ends. Further, in case of the partial ROM disk shown in FIGS. 3A and 3B, the buffer area is provided at the area adjacent to the ROM area AE.

Then, a data area and an alternate area which corresponds to that data area are prepared per one band. Accordingly, when n bands within the 16 bands are appropriated to the rewritable area ARW, n data areas and n alternate areas exist. The alternate area is an area for providing a region to be used in place of a defective region in which no recording/reproducing operation can be done due to a flaw or the like and which might exist within the data area.

When the defective regions exist within the data area as indicated by "x" in FIG. 3A for example, recording areas which are substituted for the "x" regions are set in the area within the alternate area as indicated by arrows. The defect management areas DMA1 through DMA4 are the areas where information for managing such alternation so that recording/reproducing operation can be performed adequately while avoiding such defective regions is recorded.

It is noted that the retrieval of defective regions within the data area, the specification of regions on the alternate area substituted for the defective regions, the creation of information as the defect management areas DMA1 through DMA4, the recording to the rewritable area ARW and the like are executed in the process for physically formatting the disk. That is, the rewritable area ARW is put into the recordable/reproducible state physically by putting the disk into the state of FIGS. 3A or 3B or of FIG. 4 by the physically formatting it.

However, it is necessary to implement a process for logically formatting the disk which has been physically formatted and to write a file system for managing the recording/reproducing operation in the rewritable area ARW in order to actually write files or the like to the rewritable area ARW. That is, the user can actually use the ROM disk and the partial ROM disk as recording media by implementing the physical and logical formatting processes.

The logical formatting will be explained just briefly here. The logical formatting process is a process mainly for writing a file system which can manage files in the rewritable area ARW (the rewritable area ARW and the ROM area AE in case of the partial ROM disk) at the head of the rewritable area ARW. In case of the partial ROM disk, a setup system which is a tool for the logical formatting process may be recorded within the ROM area AE in advance. It is noted that the logical formatting method is described in detail in the U.S. Ser. No. 08/846,773 (applied in Apr. 30, 1997) which has been assigned to the assignee of the present application.

3. Control Information

Various control information is recorded at the predetermined positions on the disk of the present embodiment. The predetermined positions in this case are SFP zones (outer control SFP zone and inner control SFP zone) and a GCP zone. Physical information of media (MO/ROM, etc.), a media type, positional information of SFP zone and the like are recorded in the GCP zone. Information as shown in FIG. 5 is recorded roughly in each sector (2048 bytes) in the SFP zone.

The same data with 20 bytes of data part in a sector in the GCP zone is recorded in bytes 0 through 19. For example, physical information of media (MO,/ROM, etc.), a media type (types such as ROM media all embossed, RAM media all made by MO areas or partial ROM media), a format descriptor, a start track No. of the SFP zone, a maximum lead power, clock ratio in control track are recorded.

Data as media information such as wavelength of laser, reflectance, and track pitch is recorded in bytes 20 through 29.

Data as system information is recorded in bytes 30 through 99. For example, the maximum track No., the largest physical block address, a start physical block address of DDS (Disc Definition Sector), a number of tracks of a test zone, a number of bytes of the user area and control information of 16 bands (the band 0 through the band 15) in case of the partial ROM disk and the ROM disk are recorded.

Detailed information about each of the 16 bands (the band 0 through the band 15) is recorded in bytes 100 through 419. That is, a start track address, a total number of tracks, a total number of sectors, a number of sectors as the user area, a number of parity sectors, a number of each buffer sector before and after, a number of segments of the sector, a clock ratio and the like about each band are recorded.

The bytes 420 through 2047 are reserved.

While roughly such information is recorded in the SFP zone, the media type which is information for discriminating the type of the disk is recorded at the position of the byte 1 (the second byte) in the sector of the SFP zone. Information as shown in FIG. 6 is recorded in the byte 1.

When the byte 1 is "00h" (the number h is represented by hexadecimal notation), i.e. when 8 bits are "00000000", it indicates that the disk is the ROM media. When it is "20h" and "A0h", it indicates that the disk is the RAM media and the partial ROM media, respectively.

4. Exemplary System Structure

Figure 7:
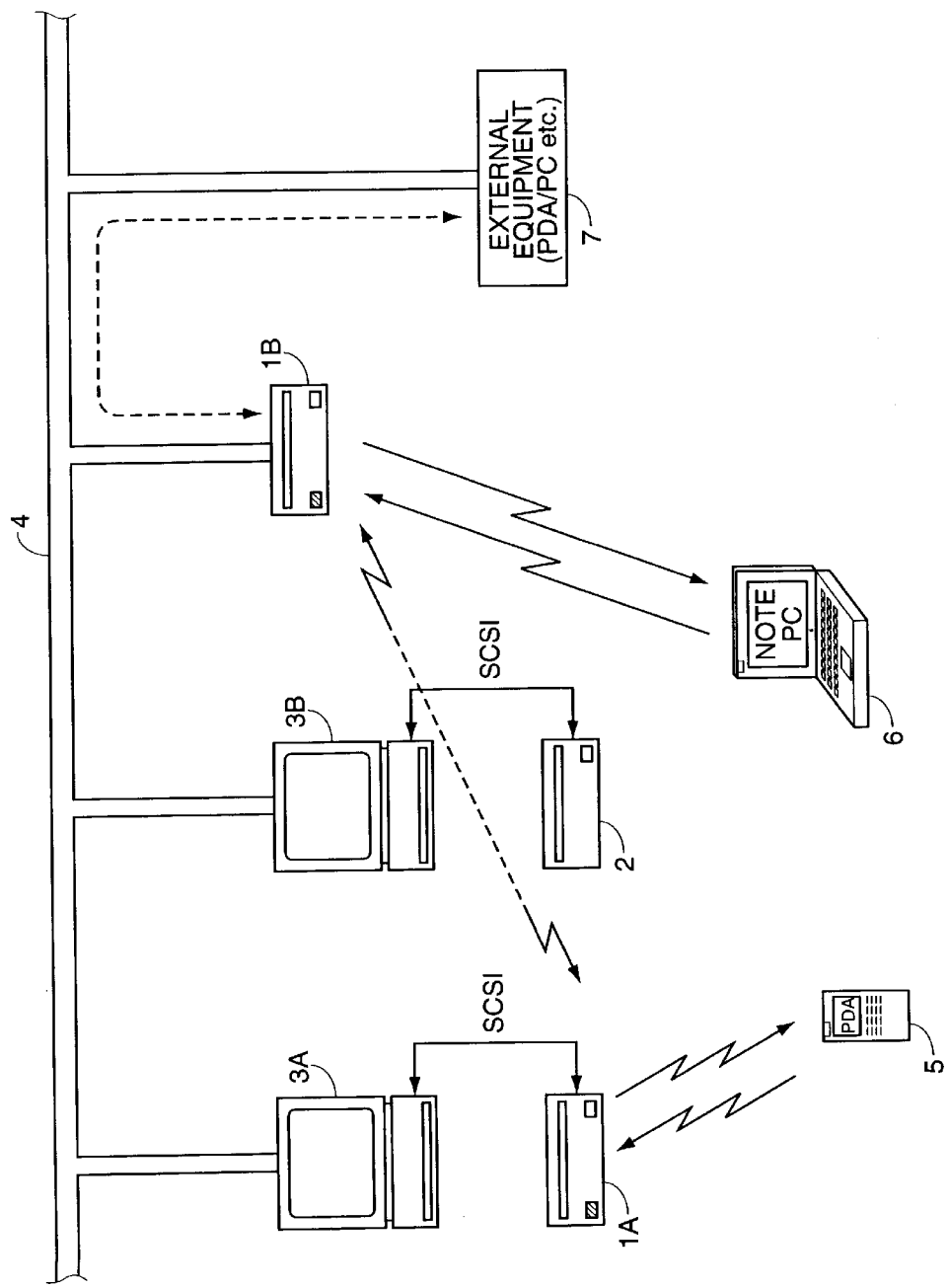
FIG. 7 is an explanatory diagram of an example of a system containing the disk drive according to the embodiment of the present invention.

FIG. 7 shows an exemplary system structure having a disk drive (recording/reproducing unit) 1 of the present embodiment which deals with the ROM disk, the RAM disk and the partial ROM disk as described above.

The disk drive 1 performs the recording/reproducing operation normally under the management and control of the host computer. While two disk drives 1A and 1B are shown as the disk drive 1 of the present embodiment in FIG. 7, the disk drive 1A is connected with a host computer 3A by SCSI (Small Computer System Interface) for example and is caused to perform recording/reproducing operation following to a read/write request made from the host computer 3A and the disk drive 1B is connected directly to a transmission path 4 as a LAN (Local Area Network).

A disk drive 2 in the figure is a related art disk drive which does not fall under the present invention. It is connected with a host computer 3B by the SCSI and performs recording/reproducing operation following only to a read/write request made from the host computer 3B. The host computer 3B holds a file manager for managing a disk in the disk drive 2.

Differing from the related art disk drive 2, the disk drives 1A and 1B of the present embodiment are provided with an interface for performing data communication in an infrared method or with an interface which allows it to be connected directly to a network as a LAN.

Further, the disk drives 1A and 1B hold a file manager for recording/reproducing a disk in the disk drives 1A and 1B as described later.

Although the host computer 3A can hold the file manager about the disk drive 1A and can cause the disk drive 1A to execute the required recording/reproducing operation by transmitting a command as the read/write request to the disk drive 1A as a matter of course, the disk drive 1A can deal with an access request specifying a file name from external equipments other than the host computer 3A, such as a PDA equipment 5 and a note type personal computer 6. When infrared interface means is mounted in the PDA equipment 5 and the note type personal computer 6 for example, commands and data for recording/reproducing files are transmitted/received between those external equipments and the disk drive 1 by infrared signals through the interfaces.

That is, the disk drive 1A can perform the requested recording/reproducing operation and data communication between the external equipments such as the PDA equipment 5 and the note type personal computer 6 equipped with the infrared interface by having the file manager by itself and the infrared interface, without going through the host computer 3A.

The disk drive 1B can also perform such operation in the same manner and it becomes possible to perform data communication between the disk drive 1A and the disk drive 1B.

Further, the disk drive 1B can be accessed via the LAN transmission path 4 by a LAN interface. For instance, an information equipment 7 such as a personal computer or a PDA equipment composing the LAN can request the disk drive 1B to perform a recording/reproducing operation by specifying a file name or the like. The host computers 3A and 3B can also do the same.

While other various communication interfaces are conceivable such as a radio LAN and the RS-232C, the interfaces using LAN and infrared rays will be exemplified in the present embodiment.

5. Structure of Disk Drive

Figure 8:
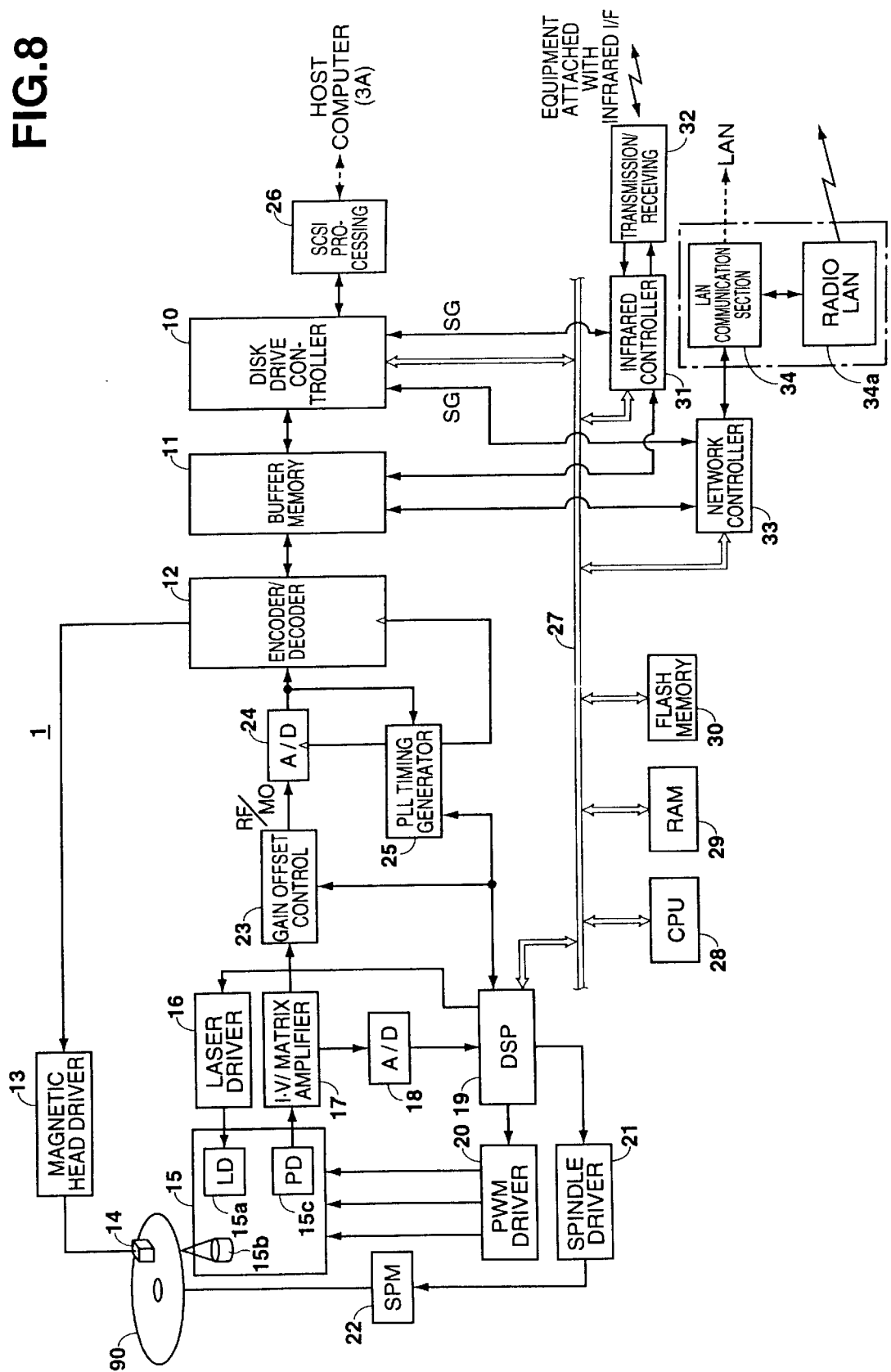
FIG. 8 is a block diagram of a recording/reproducing apparatus according to the embodiment of the present invention.

FIG. 8 shows the structure of the disk drive 1 (1A, 1B) of the embodiment. The disk drive 1 is arranged such that it can receive/transmit commands and data between the host computer 3A (e.g., a personal computer) connected by the SCSI, can record data to a disk 90 in correspondence to the supply of commands and data from the host computer 3A and can read data from the disk 90 in correspondence to commands from the host computer 3A to supply to the host computer 3A. Here, the disk 90 is the ROM disk, the RAM disk or the partial ROM disk described above.

A disk drive controller (hereinafter referred to as a controller) 10 controls all of the communication between the host computer 3A and the operation for recording/reproducing data to/from the disk drive 1.

The controller 10 runs the actual recording/reproducing drive via a DSP (Digital Signal Processor) 19 which is permitted to communicate via a bus 27. The DSP 19 has a function as a so-called servo driver and runs CAV drive of the disk 90 by supplying a spindle drive control signal to a spindle driver 21 in correspondence to servo information supplied from an A/D converter 18 and by applying a drive signal to a spindle motor 22.

It also controls the emission of laser by outputting a drive control signal to a laser driver 16 to cause a laser diode 15a in an optical head 15 to execute a laser emitting operation. The laser beam emitted from the laser diode 15a is irradiated to the disk 90 through an objective lens 15b and an optical system not shown. The light reflected from the disk 90 is irradiated to a photodetector 15c through an optical system not shown to be taken out as electrical signals.

The electrical signals obtained by the photodetector 15c are supplied to an I-V matrix amplifier 17 for current-voltage conversion and various signals are taken out by a matrix operational amplifier. That is, an RF signal as reproduced data from the ROM area AE of the disk 90, a MO signal as reproduced data from the rewritable area ARW of the disk 90, a focus error signal, a tracking error signal, a front APC signal and the like are extracted.

The focus error signal, the tracking error signal and the front APC signal which are servo information are put into digital data by an A/D converter 18 to be supplied to the DSP 19.

The DSP 19 generates a servo drive signal in correspondence to the focus error signal and the tracking error signal and supplies it to a PWM driver 20. The PWM driver 20 supplies driving electric power to a focus coil, a galvanic motor and a slide motor within the optical head 15.

That is, focus control is made by driving the objective lens in the direction of approaching/separating to/from the disk by applying the driving electric power to the focus coil by the PWM driver 20 by a focus servo drive signal based on the focus error signal and tracking control and thread move control are made by applying the driving electric power to the galvanic motor and the slide motor by the PWM driver 20 by a tracking servo drive signal and slide servo drive signal based on the tracking error signal.

The DSP 19 also control the laser driver 16 in correspondence to the front APC signal to keep the laser output level adequate.

Data read from the disk 90 during the reproducing operation is obtained as the RF signal or the MO signal from the I-V matrix amplifier 17. The output from the I-V matrix amplifier 17 is shaped into the adequate potential level by a gain/offset control section 23 and is put into digital data by an A/D converter 24.

Then, the digitized signal is supplied to an encoder/decoder section 12 and turns out to be reproduced data by undergoing processes of digital filtering, Viterbi decoding, NRZ decoding, descramble and the like. After being stored in a buffer memory 11, the reproduced data is sent to a SCSI processing section 26 by the controller 10 at a predetermined timing to be transferred to the host computer 3A.

It is noted that the output of the A/D converter 24 is supplied also to a PLL timing generator 25 in order to generate various timings synchronized with the reproduction clock and the reproducing signal for the reproducing process. That is, the reproduction clock and various timing signals based on the reproduction clock are created by the so-called PLL operation.

When a command requesting recording and data to be recorded are supplied from the host computer 3A via the SCSI processing section 26, the controller 10 stores that data in the buffer memory 11 and supplies to the encoder/decoder section 12 at a predetermined transfer rate to encode in the data form in actually recording on the disk 90. Then, the encoded data is supplied to the magnetic head driver 13 and the magnetic head driver 13 runs the operation for applying magnetic field to the disk 90 from the magnetic head 14 in correspondence to the data to be recorded.

It is noted that high lever laser for recording is output from the laser diode 15a during the recording.

As described above, the disk drive 1 is arranged such that it holds the file manager about the disk 90 by itself and that it can perform the necessary recording/reproducing operation by using the file manager without any control from the host computer 3A.

In order for that, a CPU 28, a RAM 29 and a flash memory 30 are connected to the bus 27. Further, there are provided an infrared controller 31 and a transmitter/receiver section 32 which compose the infrared interface and a network controller 33 and a LAN communication section 34, connected to the transmission path 4 shown in FIG. 7, which compose the LAN interface.

It is noted that a buffer memory controller for controlling the buffer memory 11 and a SCSI controller for controlling the SCSI processing section 26 are blocked in the disk drive controller 10 as their functions are contained therein in FIG. 8.

The infrared controller 31 is allowed to transmit/receive data to/from the buffer memory 11 by exchanging control signals SG (e.g., a transfer request signal, a transfer clock, etc.) for transferring data between the buffer memory controller within the controller 10.

Similarly to that, the network controller 33 is also allowed to transmit/receive data to/from the buffer memory 11 by exchanging control signals SG (e.g., a transfer request signal, a transfer clock, etc.) for transferring data between the buffer memory controller within the controller 10.

It is noted that while the controller is required to perform the four control functions and one memory manager function of controlling the disk drive, the buffer memory (memory manager), the SCSI, the infrared interface and the network interface in the present embodiment, all of these regions may be integrated as a controller in one chip.

The RAM 29 or the flash memory 30 holds the file manager which is management information intrinsic to the disk. As a method for bolding the file manager within the disk drive 1, it is conceivable to record data (software) as the file manager in the disk 90 in advance and to read it when the disk is charged to develop into the RAM 29. It is also conceivable to hold the file manager about the disk 90 in a solid memory such as the flash memory 30 in advance.

When the method of reading it from the disk 90 is adopted, the file manager needs not be held always in the flash memory 30. That is, no flash memory needs to be provided in this case.

When the method of holding the file manager in the flash memory 30 is adopted, it is not necessary to record the file manager in the disk 90 or to provide the RAM 29 for developing the file manager read from the disk 90.

It is noted that the memory for holding the file manager is not limited only to the flash memory, and other types of memory may be used.

It is also conceivable to hold the file manager within the ROM area of the partial ROM disk as a method of obtaining the same function with the case of using the flash memory 30, though it assumes the form of reading the file manager from the disk.

The CPU 28 instructs the controller 10 to perform the recording/reproducing operation of a certain data file by using the file manager stored in the RAM 29 or the flash memory 30. That is, it controls the recording/reproducing operation necessary for communicating with the external equipment via the infrared controller 31 or the network controller 33 as well as the operation for transmitting/receiving data to/from the infrared controller 31 and the network controller 33.

The infrared controller 31 decodes commands and data transmitted from the external equipment by means of infrared rays and received by the transmitter/receiver section 32 and transfers them to the CPU 28 and the controller 10 (buffer memory 11). It also encodes communication information from the CPU 28 and reproduced data supplied from the controller 10 (buffer memory 11) as infrared signals and transmits them from the transmitter/receiver section 32 to the external equipment.

Similarly to that, the network controller 33 decodes commands and data received from the LAN transmission path 4 by the LAN communication section 34 and transfers them to the CPU 28 and the controller 10 (buffer memory 11). It also encodes communication information from the CPU 28 and reproduced data supplied from the controller 10 (buffer memory 11) as infrared signals and transmits them from the LAN communication section 34 to the LAN network. It is noted that it is conceivable to provide a radio LAN communication section 34a to be able to deal with the radio LAN.

Figure 9:
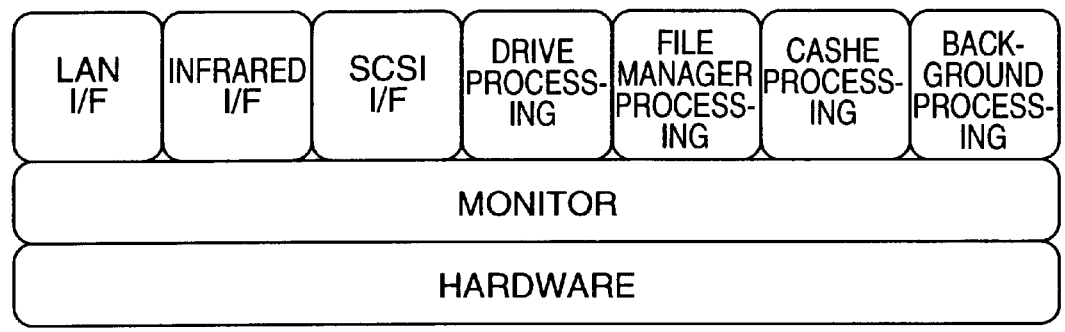
FIG. 9 is an explanatory diagram of the software structure of the recording/reproducing apparatus of the embodiment of the present invention.

FIG. 9 shows the structure of functional blocks of the software in the disk drive 1. That is, based on the processing for the hardware such as the CPU 28 and for monitoring thereof, it is composed of the processing for the LAN interface, the infrared interface, the SCSI interface, the drive, the file manager, the cache and the background.

The LAN interface processing is a processing related to the control of the network controller 33 and to the transmission/receiving of data/command through the LAN network.

The infrared interface processing is a processing related to the control of the infrared controller 31 and to the transmission/receiving of data/command to/from the external equipment through the infrared communication.

The file manager processing is a processing related to the management of the operation for recording/reproducing data to/from the disk 90 using the file manager held in the RAM 29 or the flash memory 30.

The SCSI interface processing is a processing related to the communication with the host computer 3A and the drive processing is a processing related to control in actually recording/reproducing data. The software is composed of also the cashing processing related to reading of data and the background processing.

It is noted that although the infrared interface system and the LAN interface system are adopted as the interface with the external equipment other than the host computer 3A in the present embodiment, it is not necessary to provide the both of them.

6. Operation in Charging Disk

As the method for holding the file manager within the disk drive 1, there are the methods of recording data as the file manager in each individual disk 90 and reading the file manager when the disk is charged to develop to the RAM 29 and of providing the flash memory 30 in which the file manager has been recorded as described above.

Here, the processes executed by the CPU 28 and the controller 10 in connection with the operation in charging the disk in the method of reading the file manager from the disk 90 and developing to the RAM 29 will be explained at first with reference to FIGS. 10 through 13. Then, an exemplary processing in the method of providing the flash memory 30 in which the file manager has been recorded will be explained with reference to FIG. 14 and an exemplary processing in which the both methods are used will be explained with reference to FIG. 15.

Figure 10:
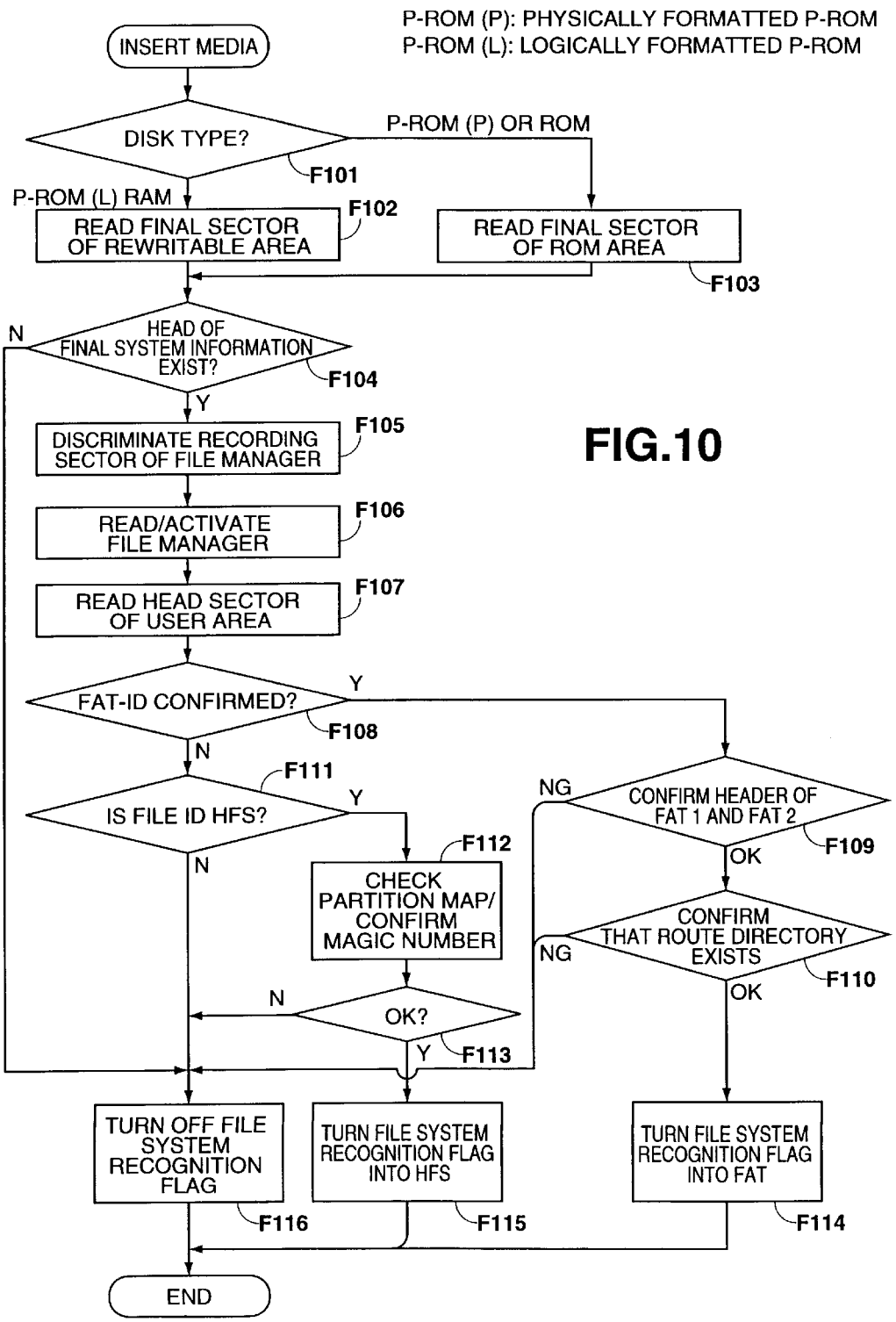
FIG. 10 is a flow chart of an exemplary process in inserting a disk according to the embodiment of the present invention.

As shown in FIG. 10, when the disk 90 is charged into the disk drive 1, the CPU 28 detects the type of the disk 90 4 in Step F101 at first. That is, it discriminates whether the disk 90 is the RAM disk, the ROM disk or the partial ROM disk.

In this discrimination process, the CPU 28 reads the data in the SFP zone on the disk explained with reference to FIGS. 5 and 6, for example, to confirm the media type code therein. When it is determined to be the RAM disk, the process advances to Step F102 to read the final sector in the rewritable area. When it is determined to be the ROM disk or the partial ROM disk (physically formatted partial ROM disk), the process advances to Step F103 to read the final sector of the ROM area.

While the file manager is recorded in a certain area on the disk 90, file system information for managing the position where the file manager is recorded on the disk is recorded in the final sector of the rewritable area in case of the RAM disk and the final sector of the ROM area in case of the ROM disk or the partial ROM disk.

Accordingly, the process in Step F102 or F103 is the process for reading the file system information. It is noted that the position where the file system information is recorded needs not be set necessarily in the final sector of the rewritable area of the RAM disk or in the final sector of the ROM area in the ROM disk or the partial ROM disk. Therefore, the process in Steps F102 or F103 may be a process for reading the sector corresponding to the setting of the sector in which the file system information is recorded.

FIGS. 12A through 12D show the exemplary file system information recorded in the final sector of the rewritable area of the RAM disk or in the final sector of the ROM area of the ROM disk or the partial ROM disk.

FIG. 12A shows an example of the file system information as the final sector of the ROM area in the partial ROM disk which has not been logically formatted. In this case, the top 24 bytes are used as a header of the file system information and a code corresponding to letters "HS FILE PROM SYSTEM" is recorded for example.

Then, a file ID is recorded with the following six bytes. The file ID is an identification code showing a mode of the file, i.e. information showing types of the file system such as a FAT (File Allocation Table) 12, a FAT 16, a HFS (Hierarchy File System) and the like.

A number of bytes per one sector is recorded in two bytes which follow the file ID and a number of sectors per one allocation is recorded in the following one byte. A start sector of the file manager, i.e. the position where the file manager is recorded, is described in the following eight bytes and a total number of sectors of a loaded file as the file manager is described in the following four bytes.

Thereby, the part (the area from the start sector to that of the number of sectors) where the file manager is recorded on the disk 90 is shown. The file manager may be recorded within the ROM area or the rewritable area. However, it is conceivable to set the file manager within the rewritable area from the beginning in the partial ROM disk having the rewritable area in which data is recorded, rewritten and erased as necessary in order to deal with renewal of data which is required for the file manager.

"FFh" as an end ID is recorded in the following one byte, showing the end of the actual data as the sector of file system information.

FIG. 12B shows an example of the file system information recorded as the final sector of the rewritable area in the partial ROM disk which has been logically formatted. In this case, the top 24 bytes are used as a header of the file system information and a code corresponding to letters "HS FILE PRAM SYSTEM" is recorded for example to discriminate with that shown in FIG. 12A. Data thereafter is the same with those shown in FIG. 12A.

It is noted that although the file system information as the final sector of the ROM area, i.e. the sector shown in FIG. 12A, is read in Step F103 when the disk is determined to be the partial ROM disk in Step F101, it is conceivable to advance to Step F102, when the disk is the partial ROM disk which has been logically formatted, to read the sector of the file system information in FIG. 12B as the final sector of the rewritable area.

Further, while the two file system information shown in FIGS. 12A and 12B come to exist together on the disk when the file system information shown in FIG. 12B is formed in the logical format, an access (process after Step F104 described later) is made by using the file system information in FIG. 12B in such a case. It is because the two file system information in FIGS. 12A and 12B may not be always the same, though there may be a case when they have the same contents, and the file system information in FIG. 12B in particular can be freely set later, it is preferable to give preference to the file system information in FIG. 12B. When the file manager cannot be recognized in a process in Step F106 described later even if an access is made by using the file system information, the file system information in FIG. 12A may be used. It is preferable to inhibit the operation for writing into the rewritable area in such a case.

When the two file system information shown in FIGS. 12A and 12B coexist, it is possible to arrange such that file managers which are different each other are shown. For instance, it is possible to arrange so as to create a file manager for managing files in the ROM area and a file manager for managing files in the rewritable area separately so that each file manager is shown by the file system information in FIGS. 12A and 12B, respectively.

FIG. 12C shows an example of the file system information formed in the final sector of the rewritable area in the RAM disk. In this case, a code corresponding to letters "HS FILE RAM SYSTEM" is recorded for example in the top 24 bytes as a header of the file system information to discriminate with those shown in FIGS. 12A and 12B. Data thereafter is the same with those shown in FIGS. 12A and 12B.

FIG. 12D shows an example of the file system information formed in the final sector of the ROM area in the ROM disk. In this case, a code corresponding to letters "HS FILE ROM SYSTEM" is recorded for example in the top 24 bytes as a header of the file system information to discriminate with those shown in FIGS. 12A, 12B and 12C. Data thereafter is the same with those shown in FIGS. 12A, 12B and 12C.

Reading the sector in which the file system information might be recorded in the process in Step F102 or F103, it is determined whether or not the header of the file system information of the top 24 bytes in FIGS. 12A through 12D exists or not in Step F104.

When no header of the file system information exists, it is a disk which cannot deal with the operation of the present embodiment, i.e. the operation for developing the file manager within the disk drive 1. Then, the process advances to Step F116 as it is to end the processing by turning off a file system recognition flag.

That is, in this case, no file manager exists in the disk drive 1 itself, so that the recording/reproducing operation related to the disk 90 can be performed only by using a file manager in the host computer 3A and the external equipment such as the PDA equipment 5 and the note type personal computer 6 cannot access directly to the disk drive 1.

When the header of the file system information exists on the other hand, it means that the file manager is recorded on the disk 90, so that the process advances Step F105 to discriminate the recording sectors in the file manager. That is, the start sector of the file manager and the information concerning to the number of sectors of the file manager in the file system information shown in FIG. 12 is read.

Then, the file manager is actually read and activated in Step F106. That is, the file manager is read from the disk 90 to develop into the RAM 29 and the CPU 28 can perform the operation for recording/reproducing a certain file to/from the disk 90 by activating the file manager without the host computer 3A.

Next, the top sector of the user area (the sector at the so-called logical block address 0) is read in Step F107. It is the top part where the actual file structure is recorded.

In the processes after Step F107, it is confirmed whether the file system information and the file manager match with the actual data file and a flag (file system recognition flag) is set in accordance to types of the confirmed file system.

The file system recognition flag is information which allows to determine whether the file manager corresponding to the charged disk 90 is being held in the RAM 29 (including the flash memory 30 in case of FIGS. 15 and 16 described later) and to show the types of the file system information.

Then, when a request for accessing to the disk is made from the external equipment, the CPU 28 decides whether or not to execute the access process corresponding to the request depending on the status of the file system recognition flag as described later in FIG. 18.

The types of the file systems cited here are the FAT 12, the FAT 16 and the HFS for the convenience of the explanation. The file system which can be applied in the present embodiment is not limited only to them as a matter of course.

Figure 13:
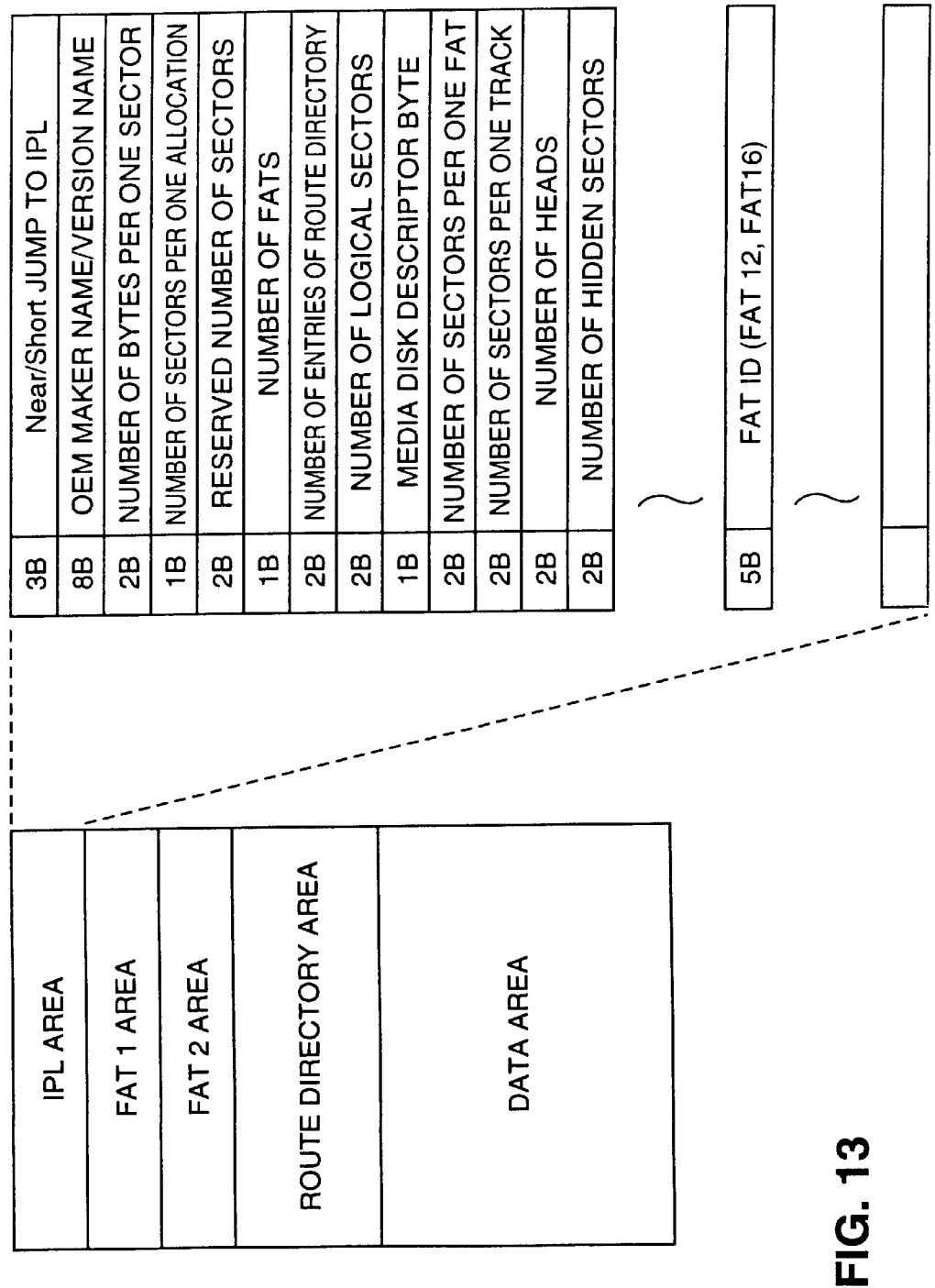
FIG. 13 is an explanatory diagram of a FAT file in the disk of the embodiment of the present invention.

When the file ID is the FAT 12 or the FAT 16 in the file system information shown in FIG. 12, the actual file structure from the logical block address 0 should be as shown in FIG. 13.

An IPL (Initial Program Leader) area is formed in the top sector and management information of the file system such as a version name, a number of bytes per one sector, a number of sectors per one allocation, a number of FAT, a number of entries of a route directory are recorded as its contents is shown schematically on the right side of the figure.

Beside the IPL area, a FAT 1 area, a FAT 2 area, a route directory area and a data area are provided, composing the FAT system.

When the file ID is the FAT 12 or the FAT 16 in the file system information shown in FIG. 12, the IPL area is read at first in the process in Step F107 to confirm a FAT-ID therein as shown in FIG. 12. A code which corresponds to the FAT 12, the FAT 16 or the like is described as the FAT-ID. When the FAT-ID can be confirmed correctly, the process advances from Step F108 to Step F109 to confirm headers of the FAT 1 and FAT 2 areas in accordance to the FAT-ID.

When the headers of the FAT 1 and FAT 2 cannot be confirmed correctly, it is the case when the FAT system is not adequately constructed by some reason. In this case, the process advances Step F116 to end the process by turning off the file system recognition flag.

In this case, the file manager developed into the RAM 29 is not corresponding correctly to the file structure of the disk 90. Therefore, considering that the file manager does not exist within the disk drive 1 by turning off the file system recognition flag, the recording/reproducing operation related to the disk 90 is allowed only by using the file manager in the host computer 3A and is disabled even when an access is made directly from the external equipment such as the PDA equipment 5 and the note type personal computer 6.

When the headers of the FAT 1 and FAT 2 areas are confirmed correctly, the process advances to Step F110 to confirm whether the route directory exists or not following to the FAT-ID. When no route directory is confirmed, it also means that the FAT system is not adequately constructed. Therefore, the process advances to Step F116 also in this case to end the process by turning off the file system recognition flag.

When the headers of the FAT 1 and FAT 2 areas and the route directory are confirmed to exist, i.e. the FAT file is confirmed as an actual file, the process of the CPU 28 advances to Step F114 to set the file system recognition flag at the value corresponding to the FAT (FAT 12 or FAT 16) and ends the process.

In this case, the CPU 28 confirms that the file manager is being developed to the RAM 29 in correspondence to the file system of the FAT 12 or the FAT 16 in the disk 90. Thereby, when a request of access specifying the file name is made from the external equipment such as the PDA equipment 5 and the note type personal computer 6, the CPU 28 can execute the operation for recording/reproducing the file to/from the disk 90 by using the file manager held in the RAM 29 thereafter (without basing on the control of the host computer 3A).

When the file ID in the file system information shown in FIG. 12 is the HFS, a code (magic key) which is an ID indicating that it is the file system of the HFS should be recorded at the top of the logical block address 0 (sector 0) read in Step F107.

When no HFS-ID exists, it means that no file system is constructed as the HFS in the disk, i.e. that the file manager developed into the RAM 29 is not corresponding correctly to the file structure of the disk 90.

Accordingly, the process advances from Step F111 to Step F116 to turn off the file system recognition flag, considering that no file manager exists within the disk drive 1. Then, the recording/reproducing operation related to the disk 90 is allowed only by using the file manager in the host computer 3A and is disabled even when an access is made directly from the external equipment such as the PDA equipment 5 and the note type personal computer 6.

When the HFS-ID exists on the other hand, the process advances from Step F111 to Step F112 to confirm information of partition map from the information of sector 0 and to look for a drive map to confirm whether the magic No. (magic key) of the partition map is an adequate value or not. When it cannot be confirmed correctly here, the process advances from Step F113 to Step F116 to turn off the file system recognition flag.

When it is confirmed correctly, i.e. the HFS file is confirmed as an actual file, the process of the CPU 28 advances to Step F115 to set the file system recognition flag at the value corresponding to the HFS and then ends the process.

In this case, the CPU 28 confirms that the file manager is being developed to the RAM 29 in correspondence to the file system as the HFS in the disk 90. Thereby, when a request of access specifying the file name is made from the external equipment such as the PDA equipment 5 and the note type personal computer 6, the CPU 28 can execute the operation for recording/reproducing the file to/from the disk 90 by using the file manager held in the RAM 29 thereafter (without basing on the control of the host computer 3A).

Figure 11:
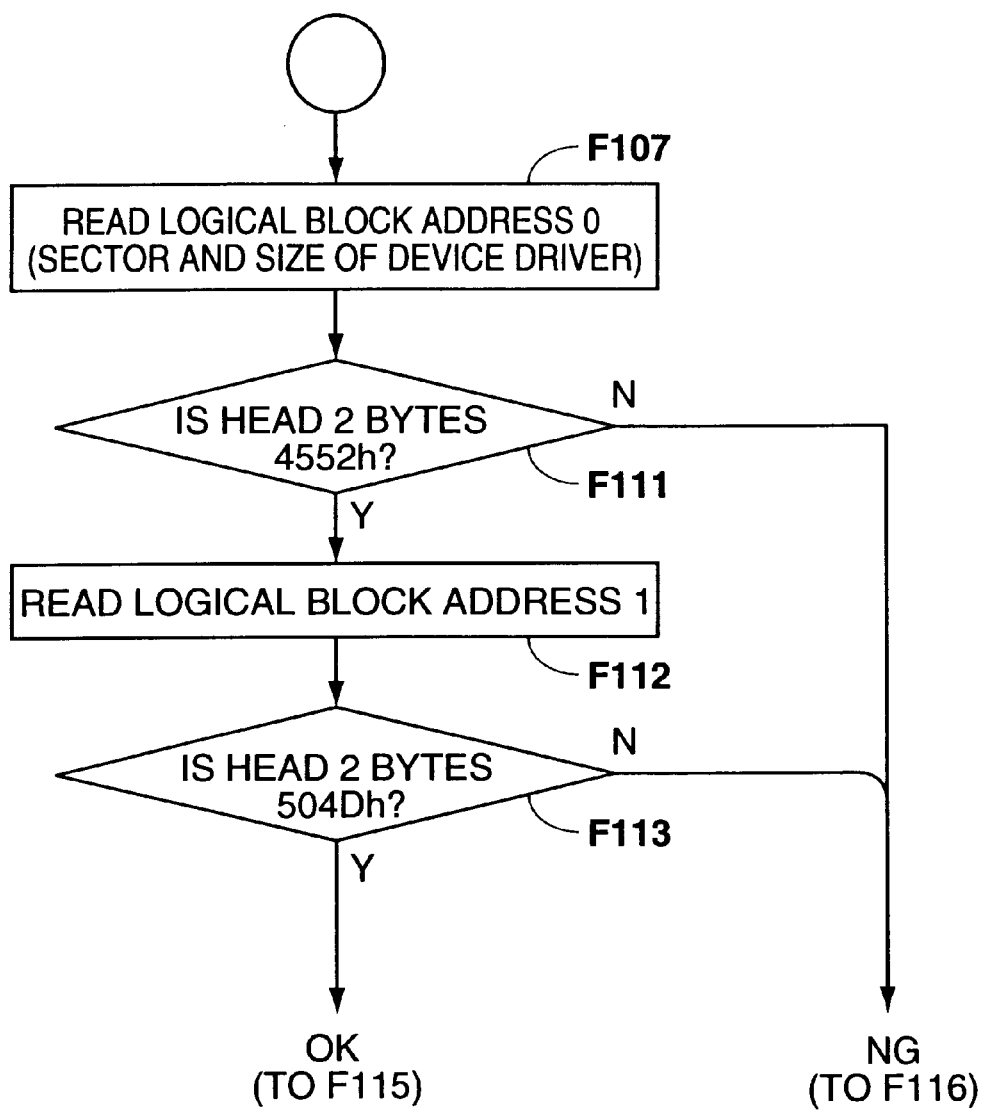
FIG. 11 is a flow chart of an exemplary process corresponding to a HFS according to the embodiment of the present invention.

FIG. 11 shows the processes from Steps F107 to F111, F112 and F113 concretely when the actual file is the HFS file.

That is, while the information in the sector 0 (logical block address 0) is read in Step F107 as described above, the process for reading this sector 0 corresponds to the process for reading a sector in which a device driver is recorded and a size. Then, the top two bytes of the sector 0 is called also as a magic key and it is considered to be adequate when this value is "4552h". When the top two bytes is not "4552h", the file is not considered to be the adequate HFS file and the process advances from Step F111 to F116 in FIG. 10.

When the top two bytes is "4552h", the data of the sector 0 thus read is considered to be the adequate data and the process advances from Step F111 to F112. Then, information in Sector 1 (logical block address 1) is read. The process for reading the sector 1 is the process for reading the partition map. The starting position and the ending position of the partition and the contents of information (per type of information such as drivers and file system) are written in the partition map.

The top two bytes of the sector 1 is also called as a magic key and it is considered to be adequate when its value is "504Dh". When the top two bytes of the sector 1 is not "504Dh", the file is not considered to be the adequate HFS file and the process advances from Step F113 to Step F116 in FIG. 10. When the top two bytes of the sector 1 is "604Dh", it is considered to be the adequate HFS file, i.e. it is determined to have been confirmed, the process advances to Step F115 to set the file system recognition flag at the value corresponding to the HFS as described above and ends the process.

While the operation in charging the disk when the method of reading the file manager from the disk 90 to develop into the RAM 29 has been explained, it is determined, when the method of providing the flash memory 30 in which the file manager has been recorded, whether the actual file of the charged disk 90 corresponds correctly to the file manager within the flash memory 30 to set the file system recognition flag.

Figure 14:
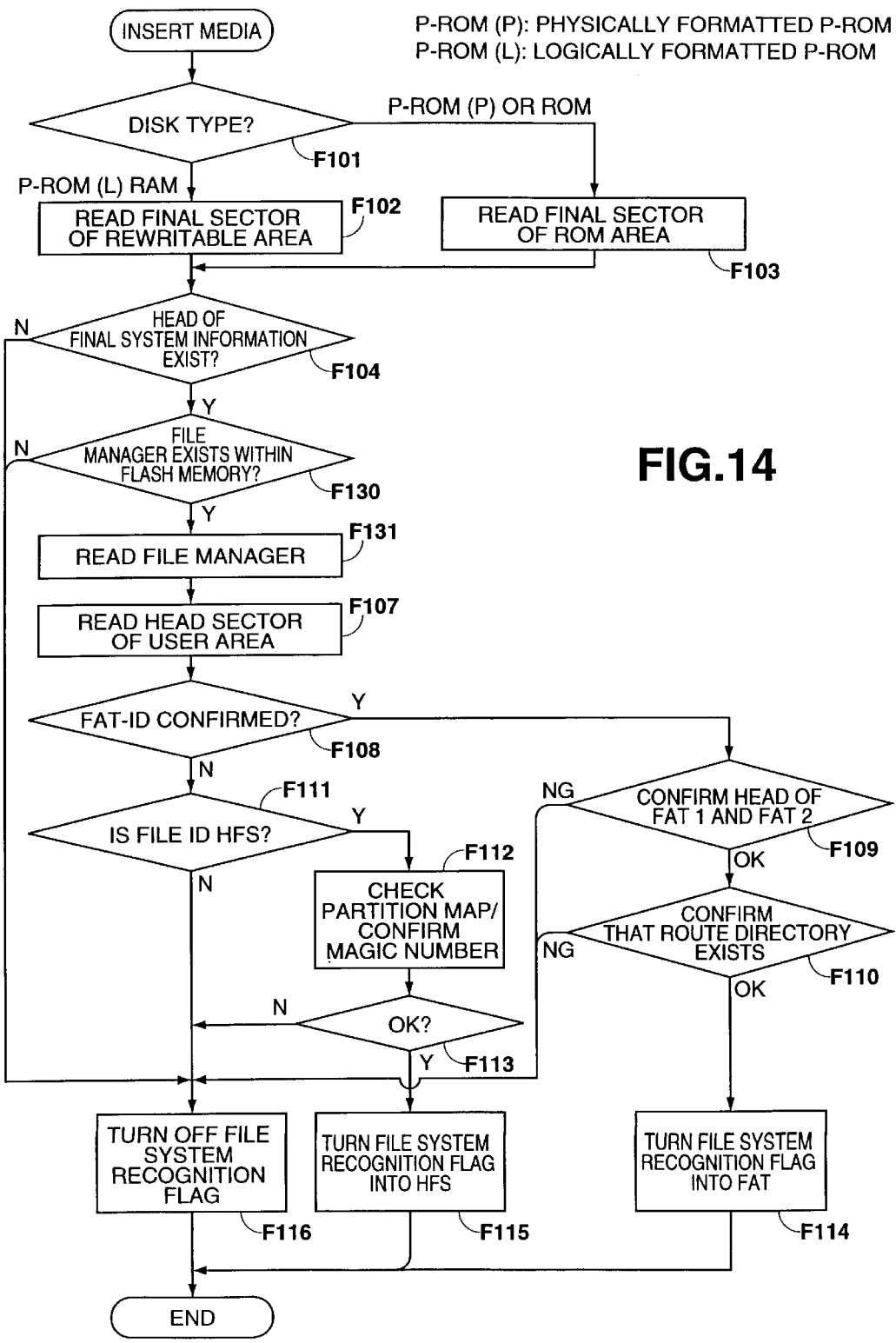
FIG. 14 is a flow chart of another exemplary process in inserting a disk according to the embodiment of the present invention.

FIG. 14 shows an example of process of this case. It is noted that the steps whose processing contents are the same with those in FIG. 10 are denoted by the same step Nos. and an explanation thereof will be omitted here.

Further, as explained in the processing examples in FIG. 10, although the information as the start sector of the file manager is recorded in the file system information recorded in the final sector, for example, of the disk 90, the file manager needs not be held necessarily within the disk 90 when the file manager is held by providing the flash memory 30. Then, when it is not held, the information as the start sector of the file manager may not be recorded or the information identifying a specific file (file as a file manager) within the file manager may be recorded.

It is needless to say that there is a case when the same file manager is held within the disk 90 when the flash memory 30 is provided to hold the file manager as described above.

Then, when the file manager held in the flash memory 30 is used, the correspondence between the charged disk 90 and the file manager within the flash memory 30 needs to be collated. The file system information recorded in the disk 90 may be used in this collation or when the file manager is recorded in the disk 90, the collation is made by comparing the contents of the file manager with the file manager within the flash memory 30.

The flow of the processes shown in FIG. 14 is different from that of FIG. 10 in that the processes in Steps F105 and F106 in FIG. 10 are different from the processes in Steps F130 and F131 in FIG. 14.

That is, when the header of the file system information is confirmed in Step F104, it is then determined whether the file manager corresponding to the charged disk 90 is stored in the flash memory 30 based on its file system information for example.

When no file manager corresponding to the disk 90 is recorded in the flash memory 30, the process advances to Step F116 to turn off the file system recognition flag. That is, no file manager exists within the disk drive 1 itself, the recording/reproducing operation related to the disk 90 is allowed only by using the file manager in the host computer 3A and is disabled when an access is made directly from the external equipment such as the PDA equipment 5 and the note type personal computer 6.

When the file manager corresponding to the disk 90 is stored in the flash memory 30 on the other hand, the process advances to Step F131 to read the file manager from the flash memory 30. Then, the same processes with those in FIG. 10 are implemented from Step F107 to set the file system recognition flag.

Figure 15:
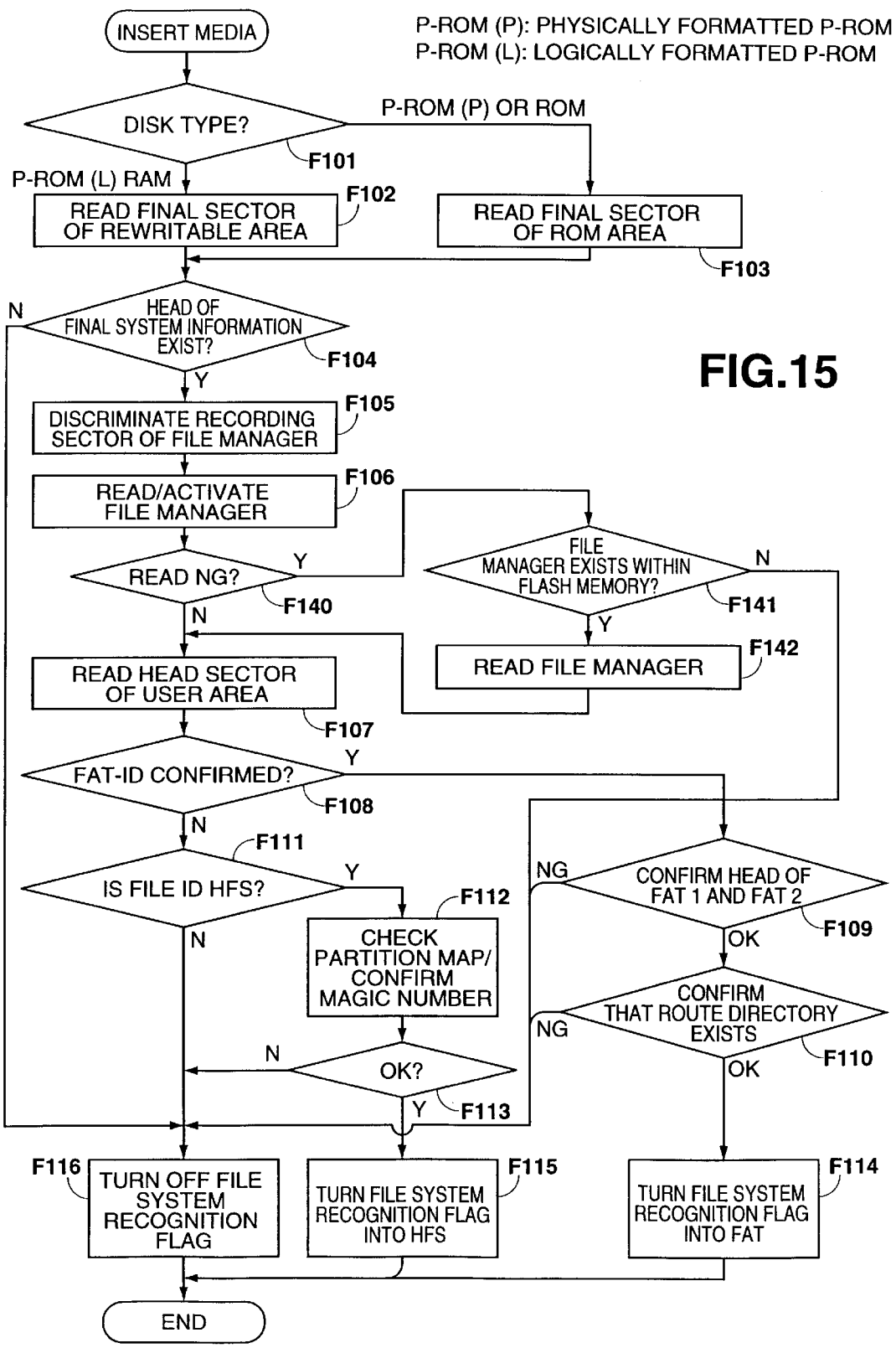
FIG. 15 is a flow chart of a still other exemplary process in inserting a disk according to the embodiment of the present invention.

While such process may be adopted when the flash memory 30 holds the file manager, the process as shown in FIG. 15 is also conceivable considering that the file manager is recorded also in the disk 90.

Steps in FIG. 15 having the same processing contents with those in FIG. 10 will be denoted by the same Step Nos. and an explanation thereof will be omitted here. The flow of processes in FIG. 15 is different from that of FIG. 10 in that Steps F140, F141 and F142 shown in FIG. 15 are added between the processes in Step F106 and Step F107.

That is, when the header of the file system information is confirmed in Step F104, the recording sector of the file manager is discriminated in Step F105 in the same manner and the file manager is read in Step F106.

When the file manager could have been read favorably into the RAM 29, the process advances from Step F140 to Step F107.

However, there is a case when the file manager cannot be read by some reason. It is the case when no file manager has been created in the disk 90 or data part as the file manager has been damaged by some accident and is unable to be read.

Then, when the reading process turns out to be NG, the process advances from Step F140 to Step F141 to determine whether or not the file manager corresponding to the disk 90 is stored within the flash memory 30.

When no file manager corresponding to the disk 90 is stored in the flash memory 30, i.e. it cannot be read from the disk 90 and the flash memory 30, the process advances to Step F116 to turn off the file system recognition flag.

In this case, because no file manager exists within the disk drive 1 itself, the recording/reproducing operation related to the disk 90 is allowed only by using the file manager in the host computer 3A and is disabled when an access is made directly from the external equipment such as the PDA equipment 5 and the note type personal computer 6.

When the file manager corresponding to the disk 90 is stored in the flash memory 30 on the other hand, the process advances from Step F141 to Step F142 to read the file manager from the flash memory 30 and then advances to Step F107.

After reading the file manager from the disk 90 or the flash memory 30 and advancing to Step F107, the same processes with those shown in FIG. 10 are implemented to set the file system recognition flag.

The operational width which allows to deal with the disk in which the file manager is recorded and with the disk in which no file manager is recorded (the disk in case the file manager is held in the flash memory 30) is widened in the case of the process shown in FIG. 15. Further, it is preferable to hold the file manager also in the flash memory 30 even if the file manager is recorded in the disk because it becomes possible to normally deal with an accident which might disallow the file manager to be read from the disk 90 should occur.

It is noted that the file manager may be read from the disk 90 when there is no file manager in the flash memory 30 by confirming it within the flash memory 30 at first in the process in FIG. 15.

7. Operation in Making Recording/Reproducing Request

Next, an operation when a request for recording/reproducing a file is made from the host computer 3A and an operation when a request for recording/reproducing a file is made from the external equipment such as the PDA equipment 5 and the note type personal computer 6 through the infrared interface will be explained. It is noted that because the operation of the disk drive 1 when a request for recording/reproducing a file is made from the external equipment 7 shown in FIG. 7 via the LAN (interface by the network controller 33 and the LAN communication section 34) is almost the same with the operation when the request for recording/reproducing the file is made through the infrared interface, except of that the input/output method is different corresponding to the modes of the interfaces, an explanation thereof will be omitted here.

Figure 16:
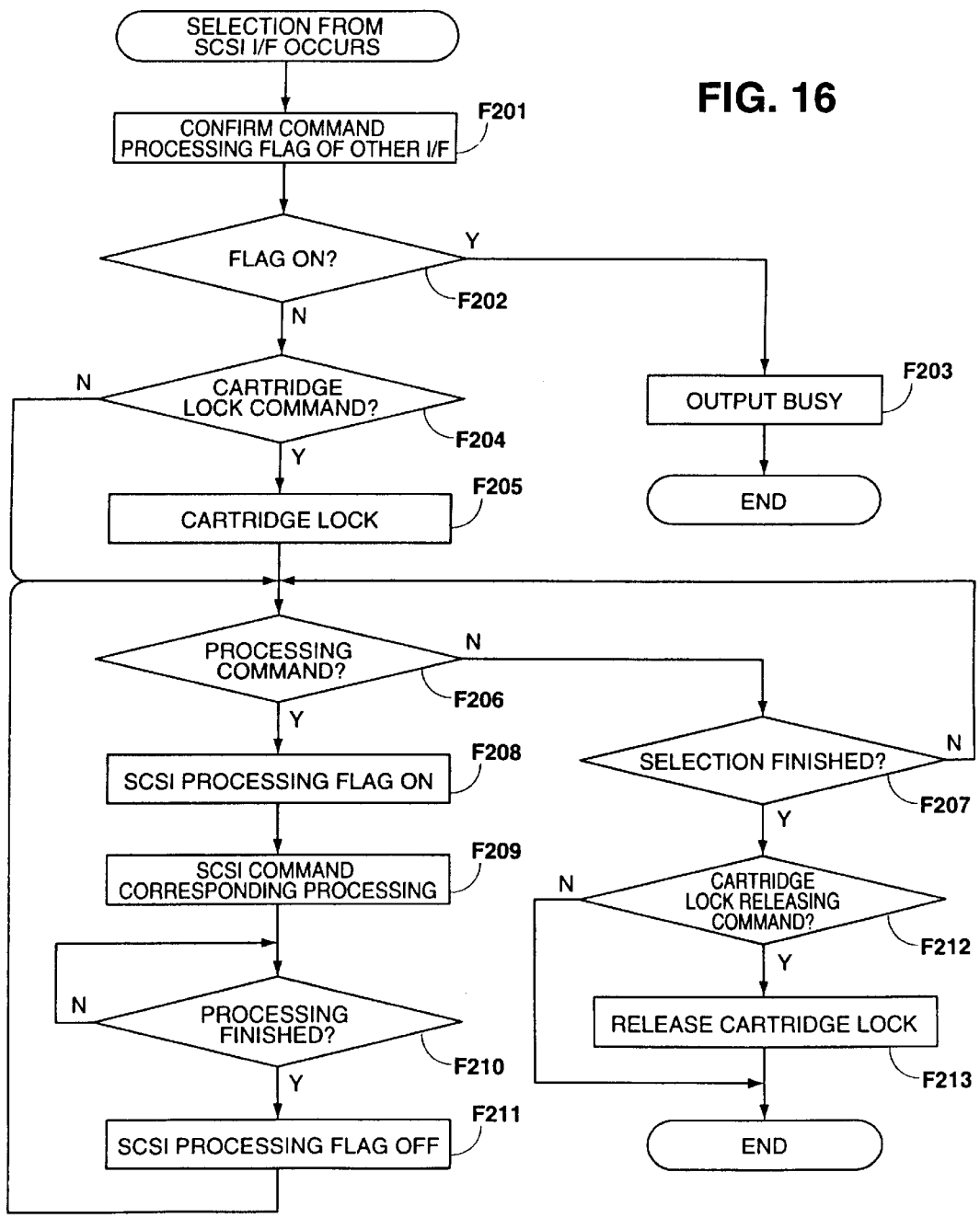
FIG. 16 is a flow chart of an exemplary process when recording/reproducing is requested from a host computer according to the embodiment of the present invention.

FIG. 16 shows processes implemented by the CPU 28 and the controller 10 when a recording/reproducing request is made from the host computer 3A, i.e. when a selection occurs in the SCSI.

When the selection on the SCSI occurs as the recording/reproducing request from the host computer 3A to the disk drive 1, the CPU 28 confirms the status of command processing flags related to the other interfaces at first in Step F201.

The command processing flags are a SCSI processing flag, an infrared IF processing flag and a LAN-IF processing flag in the present embodiment. These command processing flags are flags set in the processes in FIGS. 16 and 18 for discriminating the states of communication executed by respective interfaces.

The command processing flags related to the other interfaces in Step F201 are the infrared IF processing flag and the LAN-IF processing flag. It is noted that although the LAN- IF processing flag is not considered in FIGS. 16 and 18 in order to simplify the explanation, the LAN-IF processing flag turns on during when the process is executed through the LAN interface similarly to that the infrared IF processing flag described below turns on during when the process is executed through the infrared interface.

When the infrared IF processing flag (or the LAN-IF processing flag) is ON, it means that the communication on such interface is being executed. Then, the process advances from Step F202 to F203 to return "BUSY" as status information to the SCSI, i.e. to the host computer 3A. That is, the process showing that it cannot deal with the request from the host computer 3A is implemented.

However, there is a host computer 3A whose good operation is disabled when "BUSY" is returned by the SCSI depending on the type of the host computer 3A (i.e. depending on the type of the operating system). In such a case, a process for causing the host computer 3A to stand by as it is may be implemented when a command is received from the host computer 3A (by creating a pseudo state that no disk is charged for example). An exemplary process of such a case will be described later in FIG. 17.

When the infrared IF processing flag (and the LAN-IF processing flag) is OFF at the moment of Step F202, it means that no communication is made through those interfaces at present and the request from the host computer 3A can be handled. Then, the process advances from Step F202 to Step F204 to determined whether or not a cartridge lock command has been transmitted from the host computer 3A at first. When it has been transmitted, a cartridge lock process is implemented in Step F205.

The cartridge lock is a process set when the host computer 3A makes the operation of the disk drive 1 as the private operation of the host computer 3A to record/reproduce data to/from the disk 90. It is noted that the cartridge lock is not implemented when the process is not involved with the operation for recording/reproducing data to/from the disk 90, like when the host computer 3A sends a command to the disk drive 1 for the purpose of device check in activating the system by turning on the power source of the host computer 3A. That is, no cartridge lock command is transmitted form the host computer 3A.

While the actual read/write request is generated intermittently via the SCSI, the process advances from Step F206 to Step F208 every time when such actual command is transmitted while waiting in the loop of the Steps F206 and F207 to turn on the SCSI processing flag. Then, the process, corresponding to the command, for reading/writing data is executed in Step F209. After ending the processing, the process advances from Step F210 to Step F211 to turn off the SCSI processing flag and return to the loop of Steps F206 and F207.

The host computer 3A requests the necessary operation to the disk drive 1 and ends the selection after ending to transmit/receive a series of data due to that. Then, the process of the CPU 28 advances from Step F207 to Step F212. When a command for releasing the cartridge lock is sent in the same time, the process releases the cartridge lock in Step F213 and ends the process.

Figure 18:
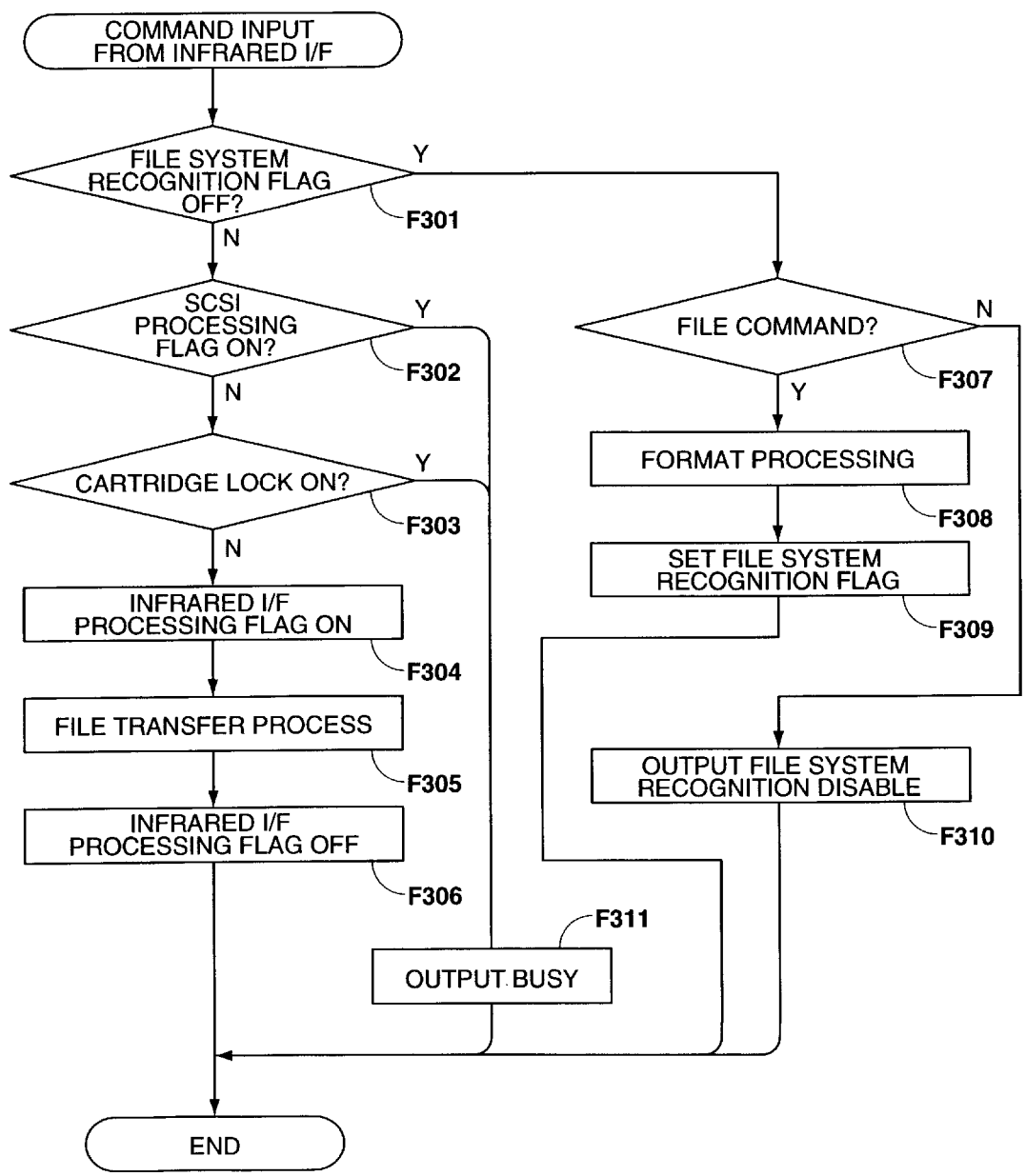
FIG. 18 is a flow chart of an exemplary process when a recording/reproducing request is made from the external equipment according to the embodiment of the present invention.

It is noted that although the host computer 3A needs not use the file manager held in the RAM 29 of the disk drive 1 or the flash memory 30 because the host computer 3A itself has the file manager of the disk 90, it is possible for the host computer 3A to request an access by a file name or the like and to execute the disk access operation by using the file manager held in the disk drive 1 in the same manner with the case of the external equipment by means of the infrared interface explained later with reference to FIG. 18.

Figure 17:
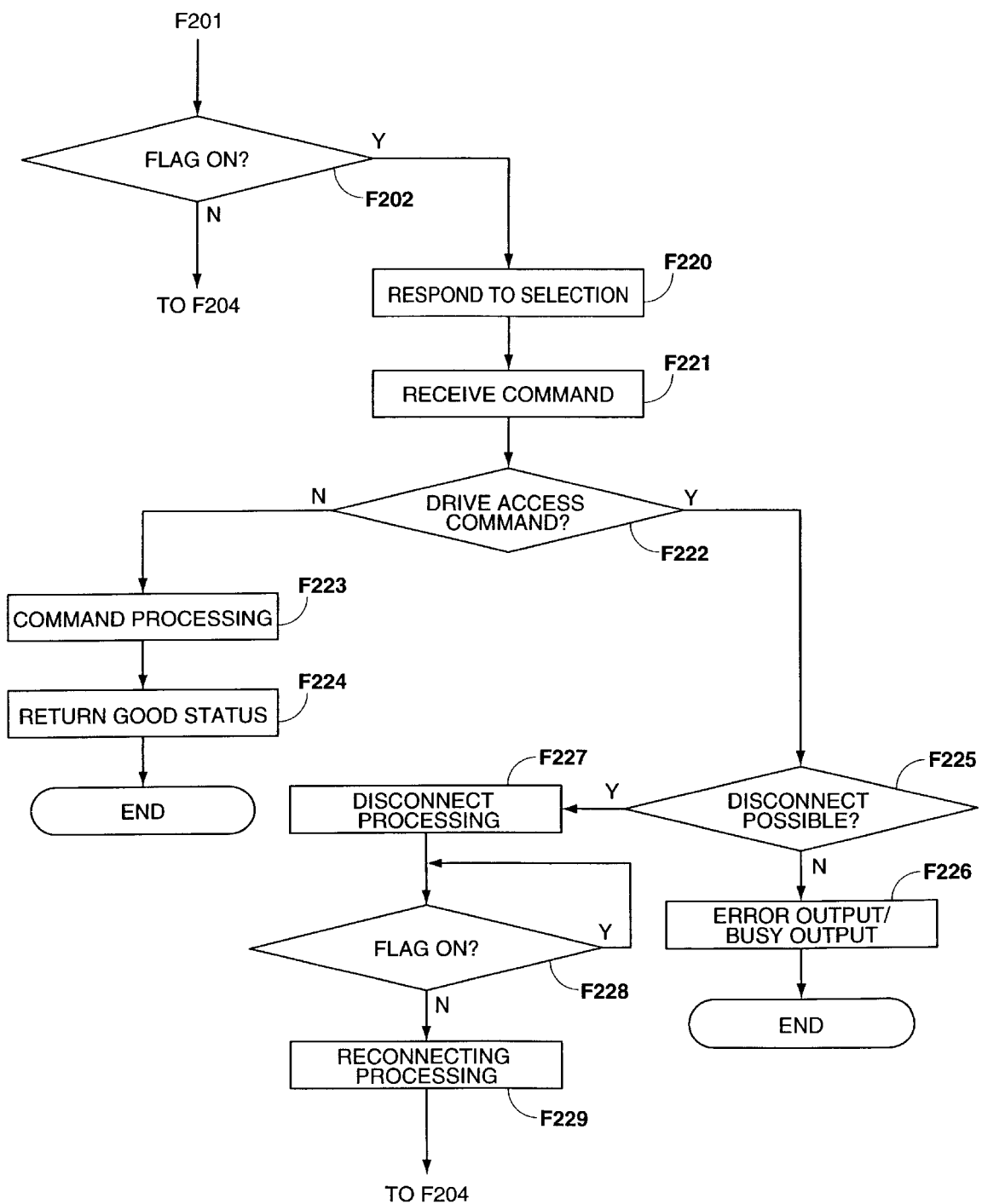
FIG. 17 is a flow chart of another exemplary process when a recording/reproducing request is made from the host computer according to the embodiment of the present invention.

By the way, the process as shown in FIG. 17 may be implemented instead of Step F203 in FIG. 16, depending on the type of the host computer 3A as described above. That is, even if it is determined that the infrared IF processing flag (or the LAN-IF processing flag) is ON in Step F202, it is arranged so as to respond to the selection by the SCSI in Step F220 and to receive the command from the host computer 3A in Step F221. Then, it is determined whether or not the received command is a drive access command for recording/reproducing data in Step F222. When it is not the drive access command, the CPU 28 executes the process corresponding to the command in Step F223, returns GOOD STATUS as a result of the processing and ends the process, because it is possible to deal with it even if a drive access by means of the infrared interface for example is being carried out.

When the received command is the drive access command, the process advances to Step F225 to determine whether it is possible to disconnect to the host computer 3A because it cannot be handled during the flag-on period. When it is impossible to disconnect, the process advances from Step F225 to Step F226 to return "ERROR" or "BUSY" to the SCSI, i.e. to the host computer 3A. The value to be returned is different depending on the system.

When it is determined to be possible to disconnect in Step F225, the CPU 28 implements a disconnect process in Step F227 and stands by in Step F228. That is, it waits for that the flag-on state is released in the disconnect state (i.e. that the drive access by the infrared interface is ended).

When the flag becomes OFF, the CPU 28 can deal with the drive access command as the selection occurred in the SCSI, so that the process advances to Step F204 in FIG. 16 after implementing a reconnect process in Step F229.

Next, the process implemented when the CPU 28 detects the input of command through the infrared interface via the transmitter/receiver section 32 and the infrared controller 31 will be explained with reference to FIG. 18.

At first, the CPU 28 confirms the file system recognition flag in Step F301. When the file system recognition flag is OFF, no file manager exists in the RAM 29 (or in the flash memory 30) in connection with the present disk 90 as described before. Therefore, because it cannot deal normally with the input of command through the infrared interface in this case, it returns that it is unable to recognize a file system to the external equipment from the transmitter/receiver section 32 in Step F310.

As an exception however, when the inputted command is a command specifying to format the disk 90, the file system recognition flag is OFF at that moment as a matter of course because a file system is to be formed from that time on. Accordingly, when it is the formatting execution command, the process advances from Step F307 to Step F308 to execute the process for formatting the disk 90. That is, the CPU 28 instructs the controller 10 to execute the formatting process corresponding to the type of the file system (FAT, HFS) specified in the formatting execution command and after ending the formatting process, sets the file system recognition flag corresponding to the type of the file system in Step F309. When the HFS formatting has been carried out for example, the CPU 28 sets the file system recognition flag at the value corresponding to the HFS.

When the file system recognition flag is ON in Step F301, the disk drive 1 can deal with the request of access through the infrared interface. In this case, the CPU 28 confirms the status of the command processing flags related to the other interfaces in Step F302. Here, it confirms the SCSI processing flag (and the LAN-IF processing flag).

When the SCSI processing flag (or the LAN-IF processing flag) is ON, communication on their interface is under execution. Then, the process advances from Step F302 to Step F311 to return "BUSY" as status information from the transmitter/receiver section 32 to the external equipment such as the PDA equipment 5 and the note type personal computer 6. That is, the CPU 28 implements the process showing that it cannot deal with the request for recording/reproducing a file from the external equipment.

There is a case when the cartridge lock is ON even if the SCSI processing flag is OFF. When it is determined in Step F303 that the cartridge lock is ON, the logical connection between the disk drive 1 and the host computer 3A by means of the SCSI is continued at this moment, so that process advances to Step F311 to return "BUSY" to the external equipment also in this case.

When the SCSI processing flag (and the LAN-IF processing flag) and the cartridge lock are OFF, no communication is being carried out on those interfaces at present and it is possible to deal with the request from the external equipment occurred through the infrared interface. Then, the process advances from Step F303 to Step F304 to turn on the infrared IF processing flag. Then, the CPU 28 executes processes for reading/writing data, for transferring by infrared rays and the like corresponding to the received command in accordance to the protocol of the infrared interface in Step F305. Then, after ending such process, the infrared IF processing flag is turned off in Step F306 to end the process.

Figure 19:
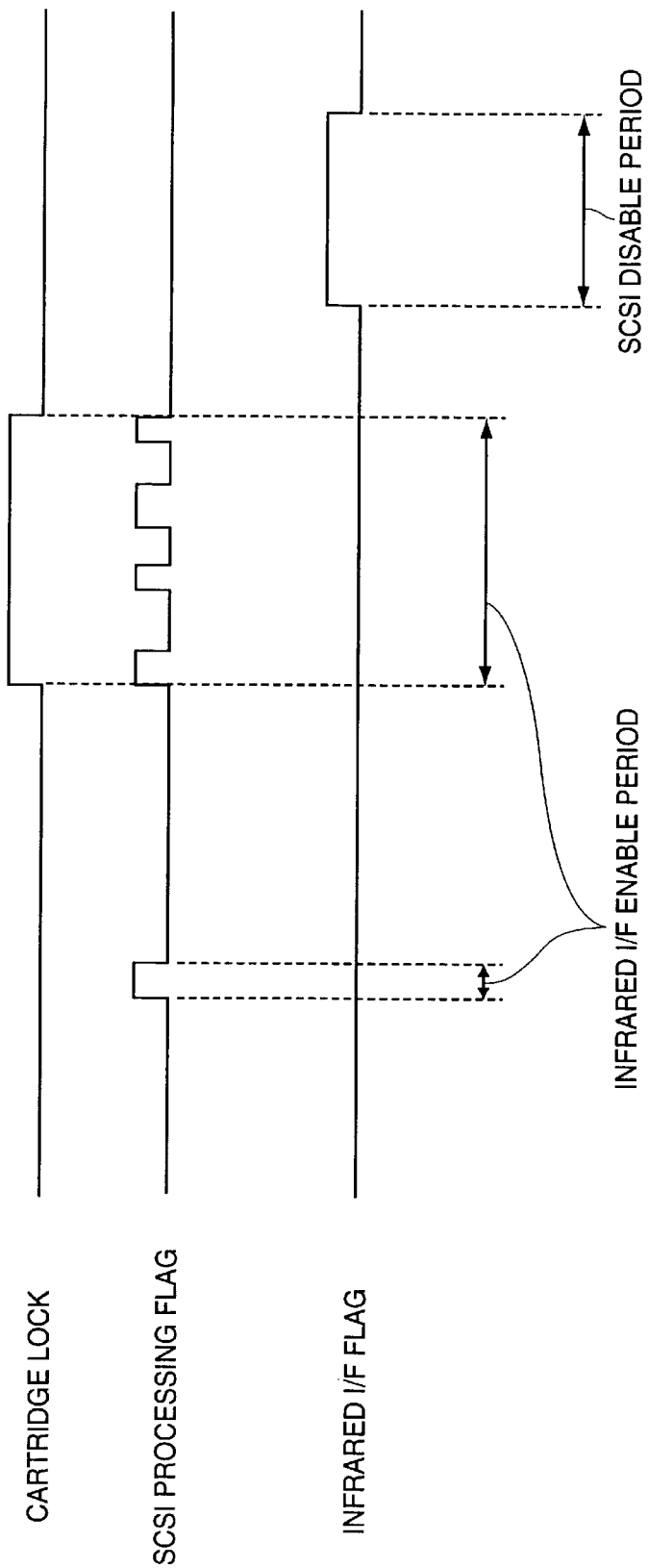
FIG. 19 is an explanatory diagram of operation timing according to the embodiment of the present invention.

No communication on the plurality of interfaces overlaps and the system operation will not be confused by implementing the interface with the host computer 3A and that with the external equipment as described above. FIG. 19 shows that state. That is, the period during which the cartridge lock and the SCSI processing flag are ON is the period during which a request made by means of the infrared interface cannot be handled and the infrared interface is not permitted, i.e. the period during which "BUSY" is returned to the external equipment, even if such request is made as shown in FIGS. 19A and 19B.

On the other hand, the period during which the infrared interface is ON is the period during which an access request made from the host computer 3A cannot be handled and the SCSI is not permitted, i.e. the period during which "BUSY" is returned to the host computer 3A, even if such request is made as shown in FIG. 19C.

It is noted that the part in which the SCSI processing flag is ON during the period in which the cartridge lock is ON is the period in which a process accompanying a series of intermittent commands for accessing to the drive is executed and the part in which the SCSI processing flag is ON during the period in which the cartridge lock is OFF is the period during which a process corresponding to some other command other than the drive access command is executed.

By the way, there is a host computer which does not control ON/OFF of the cartridge lock before and after making the request for accessing the disk drive for example, depending on the type of the host computer 3A. For instance, there is a case of the method of setting a state of mount/unmount to the connected disk drive 1 and turning on/off the state in which the host computer 3A and the disk drive 1 logically form a system by such setting. In this case, the disk drive 1 becomes a private drive of the host computer 3A during the period in which the host computer 3A "mounts" the disk drive 1 as a logically connected device. In the "unmount" state on the other hand, the host computer 3A will not consider the disk drive 1 as a logically connected device.

Figure 20:
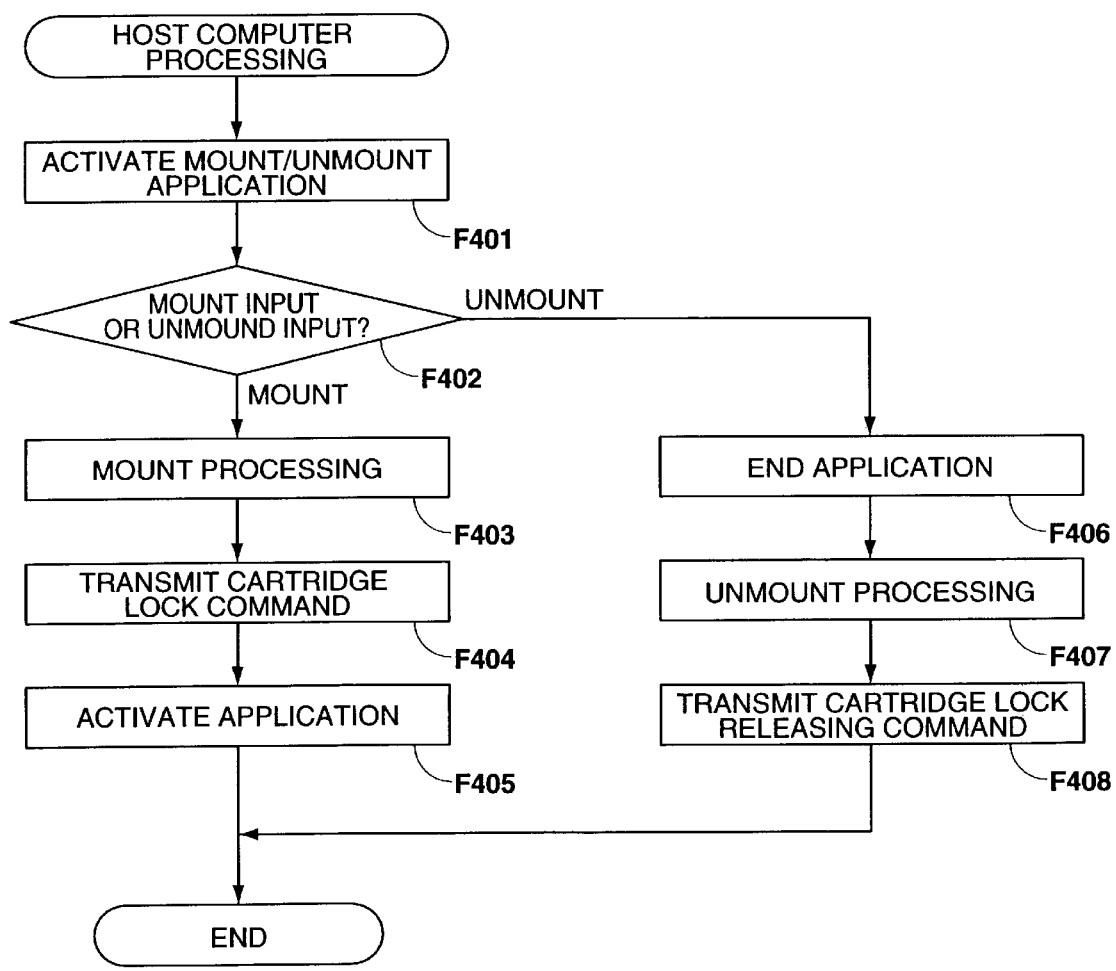
FIG. 20 is a flow chart of mounting/unmounting process with respect to the disk drive according to the embodiment of the present invention.

The host computer 3A executes processes as shown in FIG. 20 for the mount/unmount operation in correspondence to an operation made by the user. When an application for the mount/unmount operation is activated in Step F401, it is determined in Step F402 whether the operation of the user is the mount setting operation or the unmount setting operation. When it is the mount setting operation, the internal mount process, i.e. the process for setting the disk drive 1 as the logically connected device, is implemented in Step F403 and a cartridge lock command is output to the disk drive 1 in Step F404. Corresponding to that, the cartridge lock is implemented on the disk drive 1. Then, an application used for processing is activated in Step F405.

When the operation of the user is the unmount setting operation, an application which is been activated at that moment is ended in Step F406. Then, the internal unmount process, i.e. the process for releasing the disk drive 1 from being the logically connected device, is implemented in Step F407 and a cartridge lock releasing command is output to the disk drive 1 in Step F408. Corresponding to that, the cartridge lock is released in the disk drive 1.

In case of such system performing such mount/unmount operation, the unmount state should have been created, i.e. the cartridge lock of the disk drive 1 should have been released, when a request for accessing a file is made from the external equipment through the infrared interface. Accordingly, the unmount setting operation should have been made in the host computer 3A beforehand in using the disk drive 1 from the external equipment such as the PDA equipment 5 and the note type personal computer 6.

When the disk drive 1 is to be connected as the logically connected device from the host computer 3A on the other hand, the mount setting should have been made. Accordingly, when the disk drive 1 is used from the host computer 3A after using the disk drive 1 from the external equipment, the mount setting operation should be carried out in the host computer 3A before that.

While the preferred embodiment of the present invention has been explained, it is needless to say that the present invention is not confined only to the above-mentioned system structure and the structure and the processing methods of the disk drive 1 and that various examples are conceivable other than that.

Further, although the removable disk (the ROM disk, RAM disk and partial ROM disk) has been cited as an example of the recording media in the explanation described above, the present invention may be applied in the same manner also to a disk which is unremovably charged within the disk drive 1.

As described above, the present invention comprises, in the state in which at least a recording media is charged, holding means for holding file management information (file manager) about the recording media, external interface means for performing certain data communication by means of a system such as infrared data communication, LAN communication and the like and control means for executing the recording/reproducing operation to/from the recording media by using the file management information held in the holding means in correspondence to a request made from the external equipment via the external interface means. That is, the file management information and the functions for controlling the recording media are held within the recording/reproducing apparatus, it can operate corresponding to a direct access from the external equipment specifying a file name, not only by commands from the host computer having the file management information. Thereby, the usage of the recording/reproducing apparatus can be diversified and made efficient. In particular, a network file system may be created by making it possible to transfer data without a host equipment. In concrete, a cable or radio network file system may be created by means of the LAN, radio LAN, infrared interface and the like.

The recording/reproducing operation, the transfer operation and the like may be implemented adequately and the operations are prevented from entangled between the plurality of interfaces by arranging the control means so as not to respond to a request for recording/reproducing data to/from the recording media made from the external equipment at least during the period in which the process for recording/reproducing data to/from the recording media is being executed due to a request made from the host equipment and so as not to respond to a request for recording/reproducing data to/from the recording media made from the host equipment at least during the period in which the process for recording/reproducing data to/from the recording media is being executed due to a request made from the external equipment.

Further, an adequate operation may be realized correspondingly to the state of the file manager held in the holding means and to the type of the file management information because the control means is arranged so as to discriminate whether or not the file management information corresponding to the charged recording media is held in the holding means, to set file management information recognition information (file system recognition flag) as information which indicates the type of the file management information and to decide whether or not to execute a process corresponding to a request from the result of the setting of the file management information recognition information when such request for recording/reproducing data to/from the recording media is made from the external equipment and communicated via the external interface means.

Further, the recording media may be formatted from the external equipment and the usage of the system may be widened by causing the control means to decide to execute formatting corresponding to a request and to execute the formatting operation when such request for formatting the recording media is made from the external equipment, regardless of the result of the setting of the file management information recognition information.

What is claimed is:

1. An apparatus for driving a recording medium, comprising:

first interface means for receiving commands from a first control equipment and for transmitting/receiving information to/from said first control equipment;

second interface means for receiving commands from a second control equipment and for transmitting/receiving information to/from said second control equipment;

management information holding means which can hold file management information about said recording medium;

recording/reproducing means for recording/reproducing information to/from said recording medium;

accessing management information storage means for storing accessing management information indicating that said first and second interface means are under processing or not under processing, respectively; and control means for controlling the operation for recording/reproducing information to/from said recording medium performed by said recording/reproducing means in correspondence to the command from said first control equipment received via said first interface means without using the file management information held in said management information holding means and for controlling the operation for recording/reproducing information to/from said recording medium performed by said recording/reproducing means in correspondence to the command from said second control equipment received via said second interface means by using the file management information held in said management information holding means, said control means controlling said recording/reproducing means in correspondence to said command by putting the accessing information related to one of said first and second interface means as being under processing when the accessing management information related to the other of said first and second interface means shows that it is not under processing when the command is received via one of said first and second interface means and transmitting access disable information indicating that access is not permitted to one which has transmitted the command among said first and second control equipments via corresponding one among said first and second interface means when said accessing management information shows that the other of said interface means is under processing.

2. The apparatus according to claim 1, wherein said recording medium is removable and in which said file management information is recorded.

3. The apparatus according to claim 2, wherein said control means reproduces said file management information recorded in said recording medium by said recording/reproducing means to store said file management information to said management information holding means.

4. The apparatus according to claim 3, wherein said control means detects whether said file management information is recorded in said recording medium and stores file management information recognition information indicating whether said file management information has been recorded or not.

5. The apparatus according to claim 4, wherein said file management information recognition information also contains information indicating types of file management information.

6. The apparatus according to claim 4, wherein said control means inhibits an access of information to said recording medium corresponding to the command from said second control equipment received via said second interface means when said file management information recognition information indicates that no file management information is recorded.

7. The apparatus according to claim 6, wherein said control means executes the access of information to said recording medium corresponding to a formatting command regardless of said file management information recognition information when the command from said second control equipment is the formatting command.

8. The apparatus according to claim 1, wherein the accessing management information of first interface means contains access period information indicating an accessible period and actual access information sent actually via said first interface means.

9. The apparatus according to claim 1, further comprising internal storage means for storing said file management information.

10. The apparatus according to claim 9, wherein said control means detects whether file management information recorded in said recording medium coincides with file management information stored in said internal storage means when said recording medium is loaded.

11. The apparatus according to claim 1, wherein said second interface means is infrared interface means.

12. The apparatus according to claim 1, wherein said second interface means is interface means to a local area network.

13. An apparatus for driving a recording medium, comprising:

first interface means for receiving commands from a first control equipment and for transmitting/receiving information to/from said first control equipment;

second interface means for receiving commands from a second control equipment and for transmitting/receiving information to/from said second control equipment;

management information holding means which can hold file management information about said recording medium;

recording/reproducing means for recording/reproducing information to/from said recording medium;

internal storage means for storing said file management information; and control means for controlling the operation for recording/reproducing information to/from said recording medium performed by said recording/reproducing means in correspondence to the command from said first control equipment received via said first interface means without using the file management information held in said management information holding means and for controlling the operation for recording/reproducing information to/from said recording medium performed by said recording/reproducing means in correspondence to the command from said second control equipment received via said second interface means by using the file management information held in said management information holding means, said control means detecting whether file management information recorded in said recording medium coincides with file management information stored in said internal storage means when said recording medium is loaded.

14. The apparatus according to claim 13, further comprising accessing management information storage means for storing accessing management information indicating that said first and second interface means are under processing or not under processing, respectively; and said control means controlling said recording/reproducing means in correspondence to said command by putting the accessing information related to one of said first and second interface means as being under processing when the accessing management information related to the other of said first and second interface means shows that it is not under processing when the command is received via one of said first and second interface means and transmitting access disable information indicating that at access is not permitted to one which has transmitted the command among said first and second control equipments via corresponding one among said first and second interface means when said accessing management information shows that the other of said interface means is under processing.

15. The apparatus according to claim 14, wherein said recording medium is removable and in which said file management information is recorded.

16. The apparatus according to claim 15, wherein said control means reproduces said file management information recorded in said recording medium by said recording/reproducing means to store said file management information to said management information holding means.

17. The apparatus according to claim 16, wherein said control means detects whether said file management information is recorded in said recording medium and stores file management information recognition information indicating whether said file management information has been recorded or not.

18. The apparatus according to claim 17, wherein said file management information recognition information also contains information indicating types of file management information.

19. The apparatus according to claim 17, wherein said control means inhibits an access of information to said recording medium corresponding to the command from said second control equipment received via said second interface means when said file management information recognition information indicates that no file management information is recorded.

20. The apparatus according to claim 19, wherein said control means executes the access of information to said recording medium corresponding to a formatting command regardless of said file management information recognition information when the command from said second control equipment is the formatting command.

21. The apparatus according to claim 13, wherein the accessing management information of first interface means contains access period information indicating an accessible period and actual access information sent actually via said first interface means.

22. The apparatus according to claim 13, wherein said second interface means is infrared interface means.

23. The apparatus according to claim 13, wherein said second interface means is interface means to a local area network.

24. A method for driving a recording medium, comprising:

providing a first interface means receiving commands from a first control equipment and transmitting/receiving information to/from said first control equipment;

providing a second interface means receiving commands from a second control equipment and transmitting/receiving information to/from said second control equipment;

holding file management information about said recording medium in a management information holding means;

recording/reproducing information to/from said recording medium;

storing accessing management information indicating that said first and second interface means are under processing or not under processing, respectively;

controlling the operation for recording/reproducing information to/from said recording medium performed by said recording/reproducing means in correspondence to the command from said first control equipment received via said first interface means without using the file management information held in said management information holding means;

controlling the operation for recording/reproducing information to/from said recording medium in correspondence to the command from said second control equipment received via said second interface means by using the file management information held in said management information holding means, controlling said recording/reproducing means in correspondence to said command by putting the accessing information related to one of said first and second interface means as being under processing when the accessing management information related to the other of said first and second interface means shows that it is not under processing when the command is received via one of said first and second interface means, and transmitting access disable information indicating that access is not permitted to one which has transmitted the command among said first and second control equipments via corresponding one among said first and second interface means when said accessing management information shows that the other of said interface means is under processing.

25. The method according to claim 24, further comprising reproducing said file management information recorded in said recording medium to store said file management information.

26. The method according to claim 25, further comprising:

detecting whether said file management information is recorded in said recording medium; and storing file management information recognition information indicating whether said file management information has been recorded or not.

27. The method according to claim 26, further comprising inhibiting access of information to said recording medium corresponding to the command from said second control equipment received via said second interface means when said file management information recognition information indicates that no file management information is recorded.

28. The method according to claim 27, further comprising the step of executing the access of information to said recording medium corresponding to a formatting command regardless of said file management information recognition information when the command from said second control equipment is the formatting command.

29. The method according to claim 28, further comprising detecting whether file management information recorded in said recording medium coincides with file management information stored in an internal storage means when said recording medium is loaded.

30. A method for driving a recording medium, comprising:

providing a first interface means receiving commands from a first control equipment and transmitting/receiving information to/from said first control equipment;

providing a second interface means receiving commands from a second control equipment and transmitting/receiving information to/from said second control equipment;

holding file management information about said recording medium;

recording/reproducing information to/from said recording medium;

storing said file management information in an internal storage means; and controlling the operation for recording/reproducing information to/from said recording medium in correspondence to the command from said first control equipment without using the file management information;

controlling the operation for recording/reproducing information to/from said recording medium performed by said recording/reproducing means in correspondence to the command from said second control equipment using the file management information; and detecting whether file management information recorded in said recording medium coincides with file management information stored in said internal storage means when said recording medium is loaded.

31. The method according to claim 30, further comprising:

storing accessing management information indicating that said first and second interface means are under processing or not under processing, respectively;

controlling said recording/reproducing means in correspondence to said command by putting the accessing information related to one of said first and second interface means as being under processing when the accessing management information related to the other of said first and second interface means shows that it is not under processing when the command is received via one of said first and second interface means; and transmitting access disable information indicating that at access is not permitted to one which has transmitted the command among said first and second control equipments via corresponding one among said first and second interface means when said accessing management information shows that the other of said interface means is under processing.

32. The method according to claim 31, further comprising reproducing said file management information recorded in said recording medium to store said file management information.

33. The method according to claim 32, further comprising:

detecting whether said file management information is recorded in said recording medium; and storing file management information recognition information indicating whether said file management information has been recorded or not.

34. The method according to claim 33, further comprising inhibiting access of information to said recording medium corresponding to the command from said second control equipment received via said second interface means when said file management information recognition information indicates that no file management information is recorded.

35. The method according to claim 34, further comprising the step of executing the access of information to said recording medium corresponding to a formatting command regardless of said file management information recognition information when the command from said second control equipment is the formatting command.

* * * * *

UNITED STATES PATENT AND TRADEMARK OFFICE
CERTIFICATE OF CORRECTION

PATENT NO.: 6,044,436
DATED: March 28, 2000
INVENTOR(S): SATOSHI OTSUKA

It is certified that an error appears in the above-identified patent and that said Letters Patent is hereby corrected as shown below:

In Col. 23, line 63, please replace "14" with --13--.

Signed and Sealed this

Twenty-fourth Day of April, 2001

Attest:

NICHOLAS P. GODICI

Attesting Officer      Acting Director of the United States Patent and Trademark Office